US011332652B2

(12) United States Patent
Kibey et al.

(10) Patent No.: US 11,332,652 B2
(45) Date of Patent: *May 17, 2022

(54) BUOYANT PARTICLES DESIGNED FOR COMPRESSIBILITY

(71) Applicant: ExxonMobil Upstream Research Company, Spring, TX (US)

(72) Inventors: Sandeep A. Kibey, Spring, TX (US); Joshua Blunt, The Woodlands, TX (US); Ward E. Narhi, Kingwood, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/681,710

(22) Filed: Nov. 12, 2019

(65) Prior Publication Data

US 2020/0148933 A1 May 14, 2020

Related U.S. Application Data

(60) Provisional application No. 62/758,846, filed on Nov. 12, 2018.

(51) Int. Cl.
*C09K 8/24* (2006.01)
*C09K 8/05* (2006.01)
(Continued)

(52) U.S. Cl.
CPC ............ *C09K 8/24* (2013.01); *C09K 8/05* (2013.01); *E21B 41/00* (2013.01); *E21B 43/08* (2013.01)

(58) Field of Classification Search
CPC .... C09K 8/03; C09K 8/05; C09K 8/24; E21B 33/14; E21B 41/00; E21B 43/08
See application file for complete search history.

(56) References Cited

U.S. PATENT DOCUMENTS 2,350,990 A * 6/1944 Craig .................. F15B 21/06
252/1
4,969,523 A 11/1990 Martin et al.
(Continued)

FOREIGN PATENT DOCUMENTS

CN 103351855 10/2013
CN 108048054 5/2018
(Continued)

OTHER PUBLICATIONS

Dong, Guangjian, A review of the evaluation methods and control technologes for traped annular pressure on deepwater oil and gas wells, Journal of Natural Gas Science and Engineering, Jan. 2017, vol. 37, pp. 85-105.

(Continued)

*Primary Examiner* — Frances Tischler
(74) *Attorney, Agent, or Firm* — ExxonMobil Upstream Research Company—Law Department

(57) ABSTRACT

A collection of compressible particles. The compressible particles are intended to be used for attenuating pressure within a confined volume such as a trapped annulus. Preferably, the compressible particles buoyantly reside within an aqueous fluid, forming a fluid mixture. Each of the compressible particles is fabricated to collapse in response to fluid pressure within the confined volume, and comprises carbon. The particles may each have a porosity of between 5% and 40%, and a compressibility of between 10% and 30%, at up to 10,000 psi. Each of the particles has a resiliency of between 80% and 120%.

17 Claims, 14 Drawing Sheets

(51) Int. Cl.
*E21B 43/08* (2006.01)
*E21B 41/00* (2006.01)

(56) References Cited

U.S. PATENT DOCUMENTS

| | | |
|---|---|---|
| 7,096,944 B2 | 8/2006 | Vargo, Jr. et al. |
| 7,264,053 B2 | 9/2007 | Vargo, Jr. et al. |
| 7,441,599 B2 | 10/2008 | Hermes et al. |
| 8,080,498 B2 | 12/2011 | Shepherd et al. |
| 8,186,436 B2 | 5/2012 | Carlos |
| 8,584,756 B1 | 11/2013 | Barlow et al. |
| 9,109,992 B2 | 8/2015 | Wang |
| 9,631,132 B2 | 4/2017 | Ravi et al. |
| 9,879,489 B2 | 1/2018 | Shanks et al. |
| 10,066,143 B2 | 9/2018 | Whitfill et al. |
| 2004/0040703 A1 | 3/2004 | Longmore |
| 2005/0113262 A1 | 5/2005 | Ravi et al. |
| 2006/0213663 A1 | 9/2006 | Vargo et al. |
| 2006/0217270 A1 | 9/2006 | Vargo et al. |
| 2010/0113310 A1 | 5/2010 | Shepherd et al. |
| 2010/0236780 A1 | 9/2010 | Hermes et al. |
| 2013/0017980 A1 | 1/2013 | Williams et al. |
| 2014/0101918 A1 | 4/2014 | Woiceshyn et al. |
| 2015/0013988 A1 | 1/2015 | Ravi et al. |
| 2015/0129199 A1 | 5/2015 | Hoelscher |
| 2015/0184495 A1 | 7/2015 | Zhou et al. |
| 2015/0369019 A1 | 12/2015 | Raffn |
| 2017/0247983 A1 | 8/2017 | Funkhouser et al. |
| 2017/0350219 A1 | 12/2017 | Malbrel |
| 2018/0291251 A1 | 10/2018 | Gamwell et al. |
| 2020/0131424 A1 | 4/2020 | Ravi et al. |
| 2020/0148932 A1 | 5/2020 | Narhi et al. |
| 2020/0148936 A1 | 5/2020 | Narhi et al. |
| 2020/0148945 A1 | 5/2020 | Narhi et al. |
| 2020/0149374 A1 | 5/2020 | Narhi et al. |

FOREIGN PATENT DOCUMENTS

| | | |
|---|---|---|
| CN | 110218553 | 9/2019 |
| CN | 110240893 | 9/2019 |
| CN | 111018410 | 4/2020 |
| NO | 327689 B2 | 9/2009 |
| WO | 2007145735 A2 | 12/2007 |
| WO | 2010/051165 A1 | 5/2010 |
| WO | 2015/099878 A1 | 7/2015 |
| WO | 2016/060663 A1 | 4/2016 |
| WO | 2016/0164399 A1 | 10/2016 |
| WO | 2017/039616 A1 | 3/2017 |
| WO | 2019/194846 | 10/2019 |

OTHER PUBLICATIONS

Dong, Guangjian, A review of the evaluation methods and control technologies for trapped annular pressure in deepwater oil and gas wells, Journal of Natural Gas Science and Engineering, Jan. 2017, vol. 37, pp. 85-105.

Syntheon Material Safety Data Sheet, http://sweets.construction.com/swts_content_files/151411/660905.pdf, Revised Oct. 29, 2012, pp. 1-9.

\* cited by examiner

BUOYANT PARTICLES DESIGNED FOR COMPRESSIBILITY

CROSS-REFERENCE TO RELATED APPLICATION

This application claims the benefit of U.S. Provisional Application 62/758,846 filed Nov. 12, 2018 entitled Buoyant Particles Designed For Compressibility, the entirety of which is incorporated by reference herein. This application is technically related to U.S. Provisional Application 62/758,843 filed Nov. 12, 2018 entitled, "Method of Designing Compressible Particles Having Buoyancy In A Confined Volume" the entirety of which is incorporated by reference herein. This application is also technically related to U.S. Provisional Application 62/758,852 filed Nov. 12, 2018 entitled, "Method Of Placing A Fluid Mixture Containing Compressible Particles Into A Wellbore" the entirety of which is incorporated by reference herein. This application is also technically related to U.S. Provisional Application 62/758,858 filed Nov. 12, 2018 entitled, "A Fluid Mixture Containing Compressible Particles" the entirety of which is incorporated by reference herein. This application is also technically related to U.S. Provisional Application 62/758,862 filed Nov. 12, 2018 entitled, "Tubular Body Containing Compressible Particles, And Method Of Attenuating Annular Pressure" the entirety of which is incorporated by reference herein.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Field of the Invention

The present disclosure relates to the field of hydrocarbon recovery operations. More specifically, the present invention relates to the drilling and completion of wells. Further, the invention relates to buoyant particles that may be placed in a confined volume for the purpose of absorbing pressure.

Technology in the Field of the Invention

In the drilling of oil and gas wells, a wellbore is formed using a drill bit that is urged downwardly at a lower end of a drill string. The drill bit is rotated while force is applied through the drill string and against the rock face of the formation being drilled. After drilling to a predetermined depth, the drill string and bit are removed and the wellbore is lined with a string of casing.

In completing a wellbore, it is common for the drilling company to place a series of casing strings having progressively smaller outer diameters into the wellbore. A first string of casing is placed from the surface and down to a first drilled depth. This casing is known as surface casing. In the case of offshore operations, this casing may be referred to as a conductor pipe. One of the main functions of the initial string of casing is to isolate and protect the shallower, fresh water bearing aquifers from contamination by wellbore fluids. Accordingly, this casing string is almost always cemented entirely back to the surface.

One or more intermediate strings of casing is also run into the wellbore. Each successive pipe string extends to a greater depth than its predecessor, and has a smaller diameter than its predecessor.

The process of drilling and then cementing progressively smaller strings of casing is repeated several times until the well has reached total depth. A final string of casing, referred to as production casing, is used along the pay zones. In some instances, the final string of casing is a liner, that is, a pipe string that is hung in the wellbore using a liner hanger. Frequently today, the final string of casing is a long pipe string that extends along a horizontal portion (or "leg") of a wellbore.

The process of running a string of casing into the wellbore will form an annular area (or "annulus") between the pipe and the surrounding borehole. A cementing operation is typically conducted in order to fill or "squeeze" selected annular areas with a column of cement. The combination of cement and casing strengthens the wellbore and facilitates the zonal isolation of certain sections of a hydrocarbon-producing formation (or "pay zones") behind the casing.

In most wellbore completion jobs today, especially those involving so called unconventional formations where high-pressure hydraulic operations are conducted downhole, the surface casing and perhaps the first intermediate string of casing are entirely cemented up to the surface. Hydraulic cements, usually Portland cement, are used to cement the tubular bodies within the wellbore. However, in some completions, particularly those where overlapping strings of casing extend to the surface, the operator may choose to leave an extended portion of certain casing strings without cement. This saves the drilling company time and the well operator money. However, this also means that upon completion an extended section of wellbore will have wellbore fluids residing on top of a column of cement up to the well head.

FIG. 1A is a cross-sectional view of a wellbore 100 undergoing completion.

The wellbore 100 defines a bore 10 that has been drilled from an earth surface 105 into a subsurface 110. The wellbore 100 is formed using any known drilling mechanism, but preferably using a land-based rig or an offshore drilling rig on a platform. For deeper horizontal wells such as the one shown in FIG. 1A, the wellbore may be formed at least in part through the use of a downhole motor and MWD electronics.

The wellbore 100 is completed with a first string of casing 120, sometimes referred to as surface casing. The wellbore 100 is further completed with a second string of casing 130, typically referred to as an intermediate casing. In deeper wells, that is wells completed below 7,500 feet, at least two intermediate strings of casing will be used. In FIG. 1A, a second intermediate string of casing is shown at 140.

The wellbore 100 is finally completed with a string of production casing 150. In the view of FIG. 1A, the production casing extends from the surface 105 down to a subsurface formation, or "pay zone" 115. The wellbore 100 is completed horizontally, meaning that a horizontal "leg" 50 is provided. The leg 50 is formed from the end of the production casing 150. The leg 50 includes a heel 153 and a toe 154 along the pay zone 115. In this instance, the toe 154 defines the end (or "TD") of the wellbore 100.

It is observed that the annular region around the surface casing 120 is filled with cement 125. The cement (or cement matrix) 125 serves to isolate the wellbore from fresh water zones and potentially porous formations around the casing string 120 and near the surface 105.

The annular regions around the intermediate casing strings 130, 140 are also filled with cement 135, 145. Similarly, the annular region around the production casing 150 is filled with cement 155. However, the cement 135, 145, 155 is only placed behind the respective casing strings 130, 140, 150 up to the lowest joint of the immediately surrounding casing string, or cement shoe. Thus, a non-cemented annular area 132 is preserved above the cement matrix 135; a non-cemented annular area 142 is preserved above the cement matrix 145; and a non-cemented annular area 152 is preserved above the cement matrix 155.

FIG. 1B is a perspective view of the wellbore 100 of FIG. 1A, or at least the upper half of the wellbore 100. Here, casing strings 120, 130, 140 and 150 are again shown. In addition, cement matrices 125, 135, 145 and 155 are visible. Finally, non-cemented annular areas 132, 142 and 152 are shown.

An annulus can be considered "trapped" if the cement pumping places the top of cement (or "TOC") higher than the previous shoe. Alternately, if the shoe remains open to the formation (not blocked by the cement) solids may settle out from the annular fluid, effectively plugging up the bottom of the annulus. In any instance, those of ordinary skill in the art will understand that the non-cemented annular areas 132, 142, 152 are not unfilled above the TOC; rather, they are left with wellbore fluids therein. Such fluids may include drilling fluids, aqueous acid, and formation gas. When the well is completed, a wellhead is placed over the annular areas 132, 142, 152, sealing these regions. For this reason, each may be referred to as a "trapped annulus."

During the course of producing hydrocarbons, warm production fluids flow through a tubing string (not shown) up to the surface. These fluids raise the temperature inside the wellbore 100, including the fluids inside the one or more trapped annuli 132, 142, 152. This, in turn, will increase the pressure within each trapped annulus. (Note that the effect of a trapped annulus is that the fluid in the annulus has no path to escape should the pressure rise.) This pressure can exceed the pressure ratings (burst or collapse pressures) of the inner strings of casing. For example, a trapped annulus can lead to pipe collapse or even well failure.

Accordingly, a need exists for an improved wellbore design that can absorb burst pressure as wellbore temperature is increased. Further, a need exists for a unique carrier fluid mixture having collapsible particles capable of absorbing an increase in fluid pressure within a trapped annulus. A need further exists for a collection of buoyant particles uniquely designed for compressibility.

BRIEF SUMMARY OF THE DISCLOSURE

A collection of compressible particles is provided. The compressible particles are intended to be used for attenuating pressure within a confined volume such as a trapped annulus. Preferably, the compressible particles reside within an aqueous fluid, forming a fluid mixture. The aqueous carrier fluid may be fresh water, brine or an aqueous drilling fluid.

The compressible particles are designed to be buoyant when placed within the aqueous carrier fluid. In one aspect, the compressible particles are at a concentration of 5% to 40% of the fluid mixture, by volume.

Each of the compressible particles is fabricated to collapse in response to fluid pressure within a confined volume. Each of the particles preferably comprises carbon. At least some of the compressible particles may comprise graphite or graphene beads. In one embodiment, each of the compressible particles comprises a porous graphite carbon (PGC) material. In this instance, an inner core is composed of amorphous carbon, while an outer shell is composed of graphitic carbon. Both the inner core and the outer shell are porous.

In one embodiment, each of the compressible particles has an outer diameter that is between 10 µm and 700 µm (in dry state). More preferably, the particle size distribution will be between 100 µm to 700 µm, and may average around 250 µm. Optionally, at least 50% of the compressible particles will have a range of outer diameter that is between 50 µm to 600 µm. Together, the particles may each have a porosity of between 5% and 40%, or the particles together may have an average porosity of between 10% and 25%.

Each of the particles has a resiliency of between 80% and 120%, and more preferably between 87% and 117%, inclusive. At the same time, each of the particles may have a compressibility of between 10% and 30%, and more preferably between 14% and 27%, inclusive, up to 10,000 psi. Preferably, the fluid mixture further comprises a reductant provided to reduce gas content.

In one embodiment, each of the compressible particles has a density that is between 12.0 ppg and 12.8 ppg, inclusive. Preferably, the particle density is lower than a density of the carrier fluid. Each of the compressible particles has either a circular or an oval profile. Alternatively, each of the compressible particles has a same polygonal profile. Alternatively still, the compressible particles have random polygonal profiles.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

FIG. 3A presents the filter screen of FIG. 2A in an embodiment that is similar to a sand screen.

FIG. 3B presents the filter screen of FIG. 2A as a slotted tubular.

DETAILED DESCRIPTION OF CERTAIN EMBODIMENTS

Definitions

Figure 1A:
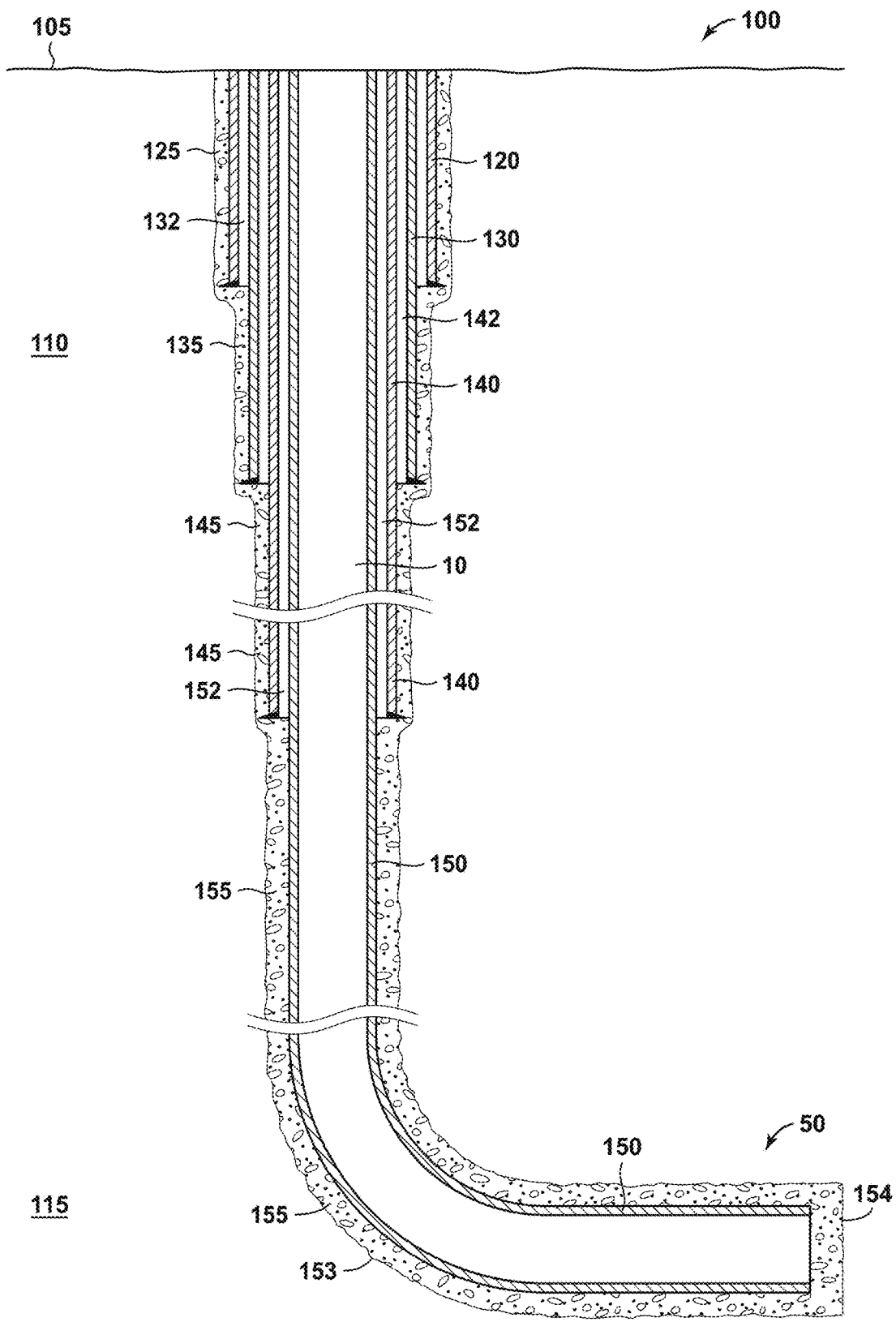
FIG. 1A is a side view of a wellbore. The wellbore has a plurality of casing strings cemented into place, and is completed with a string of production casing.

For purposes of the present application, it will be understood that the term "hydrocarbon" refers to an organic compound that includes primarily, if not exclusively, the elements hydrogen and carbon. Hydrocarbons may also include other elements, such as, but not limited to, halogens, metallic elements, nitrogen, oxygen, and/or sulfur.

As used herein, the term "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions or at surface conditions. Hydrocarbon fluids may include, for example, oil, natural gas, coalbed methane, shale oil, pyrolysis oil, pyrolysis gas, a pyrolysis product of coal, and other hydrocarbons that are in a gaseous or liquid state, or combination thereof.

As used herein, the terms "produced fluids," "reservoir fluids" and "production fluids" refer to liquids and/or gases removed from a subsurface formation, including, for example, an organic-rich rock formation. Produced fluids may include both hydrocarbon fluids and non-hydrocarbon fluids. Production fluids may include, but are not limited to, oil, natural gas, pyrolyzed shale oil, synthesis gas, a pyrolysis product of coal, oxygen, carbon dioxide, hydrogen sulfide and water.

As used herein, the term "fluid" refers to gases, liquids, and combinations of gases and liquids, as well as to combinations of gases and solids, combinations of liquids and solids, and combinations of gases, liquids, and solids.

As used herein, the term "wellbore fluids" means water, hydrocarbon fluids, formation fluids, or any other fluids that may be within a wellbore during a production operation. Wellbore fluids may include a weighting agent that is residual from drilling mud.

As used herein, the term "gas" refers to a fluid that is in its vapor phase. A gas may be referred to herein as a "compressible fluid." In contrast, a fluid that is in its liquid phase is an "incompressible fluid."

As used herein, the term "subsurface" refers to geologic strata occurring below the earth's surface.

As used herein, the term "formation" refers to any definable subsurface region regardless of size. The formation may contain one or more hydrocarbon-containing layers, one or more non-hydrocarbon containing layers, an overburden, and/or an underburden of any geologic formation. A formation can refer to a single set of related geologic strata of a specific rock type, or to a set of geologic strata of different rock types that contribute to or are encountered in, for example, without limitation, (i) the creation, generation and/or entrapment of hydrocarbons or minerals, and (ii) the execution of processes used to extract hydrocarbons or minerals from the subsurface.

As used herein, the term "wellbore" refers to a hole in the subsurface made by drilling or insertion of a conduit into the subsurface. A wellbore may have a substantially circular cross section. The term "well," when referring to an opening in the formation, may be used interchangeably with the term "wellbore."

As used herein and unless specified otherwise, the terms "annular region" "annulus," "containment area," or the like refer to the volume between an inner tubular member and an outer tubular member or wellbore wall, the term "outer" meaning having a larger radius with respect to the inner member. As used herein, the annular region is normally isolated, trapped, or otherwise confined annular region, in that it is not in or no longer in circulating fluid communication with an inner bore of the inner tubular member during an operational period for the wellbore. These terms as used herein typically refers to the annuluses between casing and/or liner tubular strings, or between a production tubing string and a production casing or liner, above a seal bore or production packer, as when a well is constructed wellbore fluids within these types of annuluses typically become trapped and are no longer capable of circulating fluid therein or therefrom.

DESCRIPTION OF SELECTED SPECIFIC EMBODIMENTS

Figure 1B:
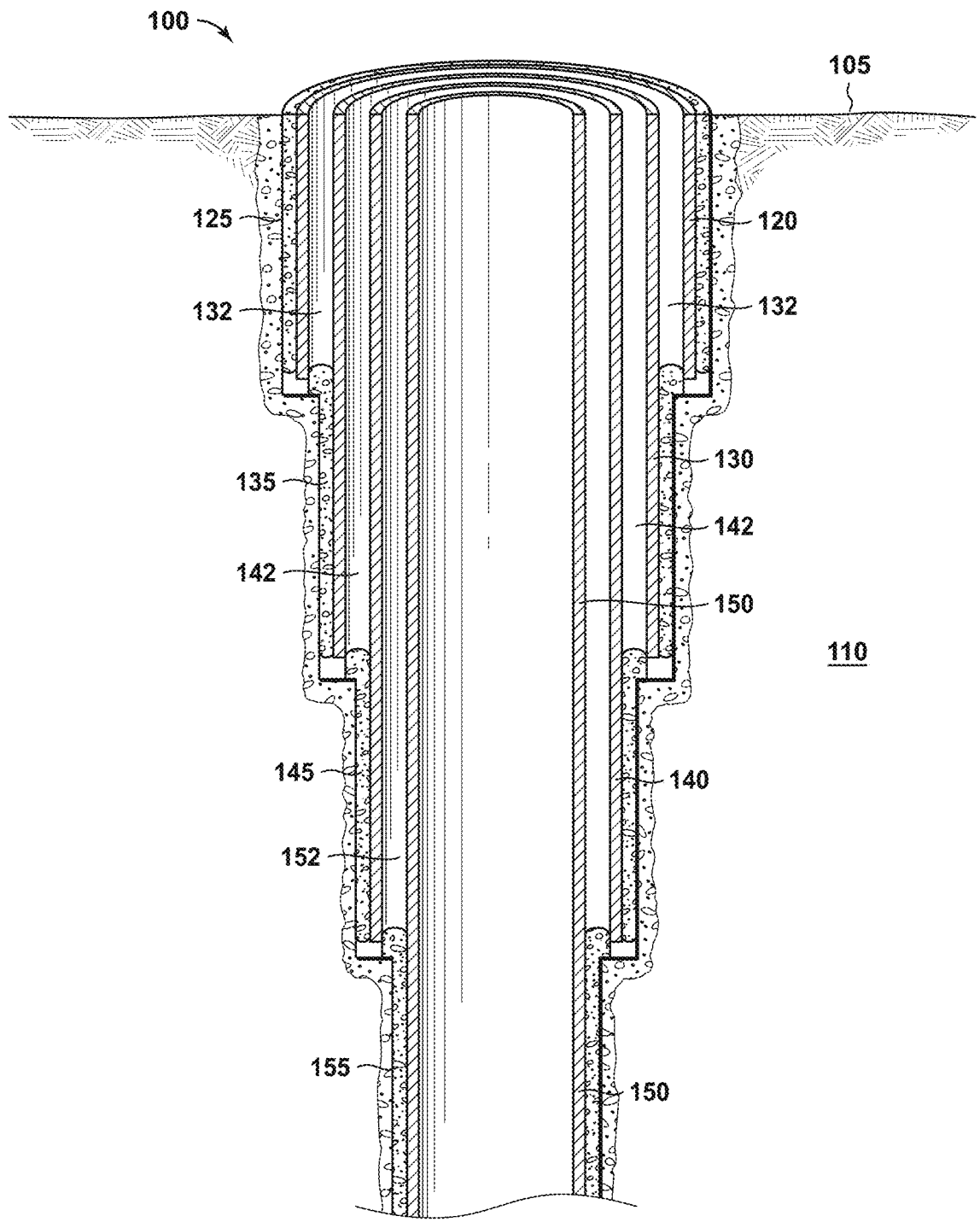
FIG. 1B is a side perspective view of an upper half of the wellbore of FIG. 1A. Three annular regions are shown as trapped annuli.

FIG. 2 is a perspective view of a tubular body 200 of the present invention, in one embodiment. In a preferred aspect, the tubular body 200 is deployed in a wellbore as part of a string of casing. Stated another way, the tubular body 200 may be threadedly placed in series with a string of casing (such as casing string 140 of FIG. 1B).

The tubular body 200 is specifically designed to reside along an open annular region such as region 142. The tubular body 200 may be of a standard length for a pipe joint, such as 30 feet, 32 feet or even 40 feet.

The tubular body 200 comprises an upper end 210 and a lower end 214. In the vernacular of the industry, the upper end 210 is the box end while the lower end 214 is the pin end. The box end 210 comprises internal threads 212 that are configured to threadedly connect with the pin end of an immediately upper joint of pipe (not shown). Reciprocally, the pin end 214 is configured to "stab" into the box end of an immediately lower joint of pipe (not shown) for threaded connection.

The tubular body 200 defines an elongated wall forming a pipe 220 (or elongated pipe body). Placed along the outer diameter of the pipe 220 is a filter screen 230. The filter screen 230 has an upper end 232 and a lower end 234 and is designed to contain a plurality of compressible particles. An example of particles within the screen 230 is shown at 240 in FIG. 2B, discussed further below.

In one aspect, the filter screen 230 has both an inner surface 235 and an outer surface 236, forming a defined cylindrical body. The inner surface 235 resides closely along the pipe body 220. The filter screen 230 may be welded onto the pipe 220. Alternatively, the filter screen 230 may be secured to the pipe 220 through a friction fit or by an adhesive to form a cylindrical body. In another embodiment, the screen 230 does not have an inner surface, but is securely fastened to the outer diameter of the pipe body 220 itself to contain the compressible particles 240.

The filter screen 230 is fabricated from a porous material. In the embodiment shown in FIG. 2A, the material is a permeable polymeric material having micro-pores or slots that form a mesh. Suitable polymeric materials may include neoprene, polyurethane rubber, vinyl, nitrile rubber, butyl rubber, silicone rubber, or combinations thereof. Alternatively, and as described further below in connection with FIGS. 3A and 3B, the material may be a metal alloy or a ceramic material having pre-fabricated micro-slots.

Figure 2A:
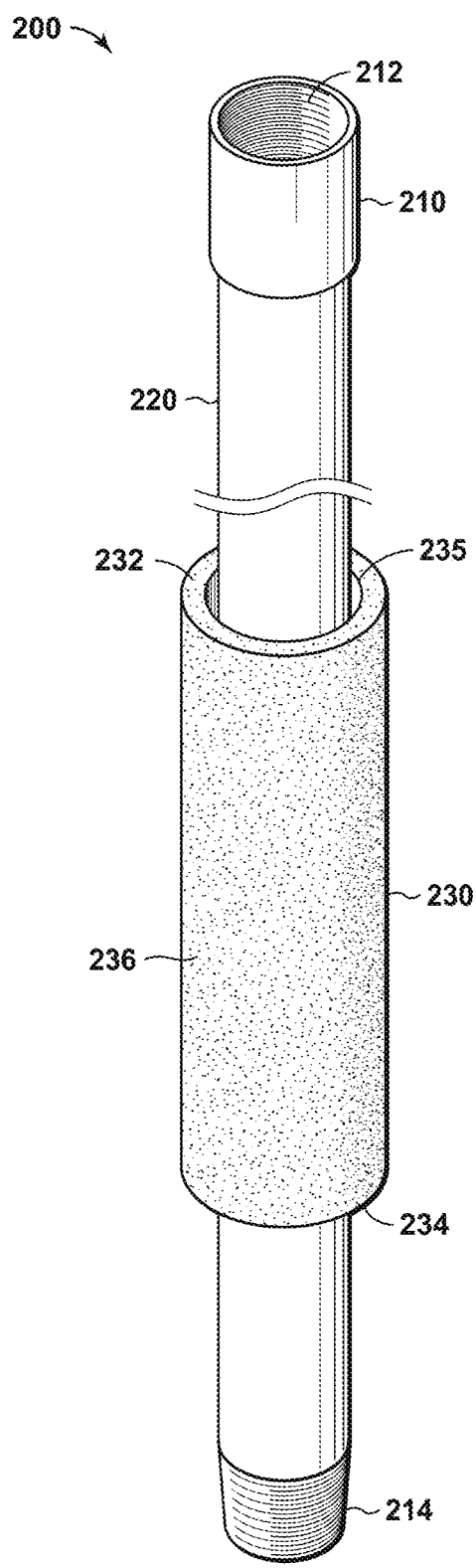
FIG. 2A is a perspective view of a tubular body of the present invention, in one embodiment. In a preferred aspect, the tubular body is deployed in a wellbore as part of a string of casing.
Figure 2B:
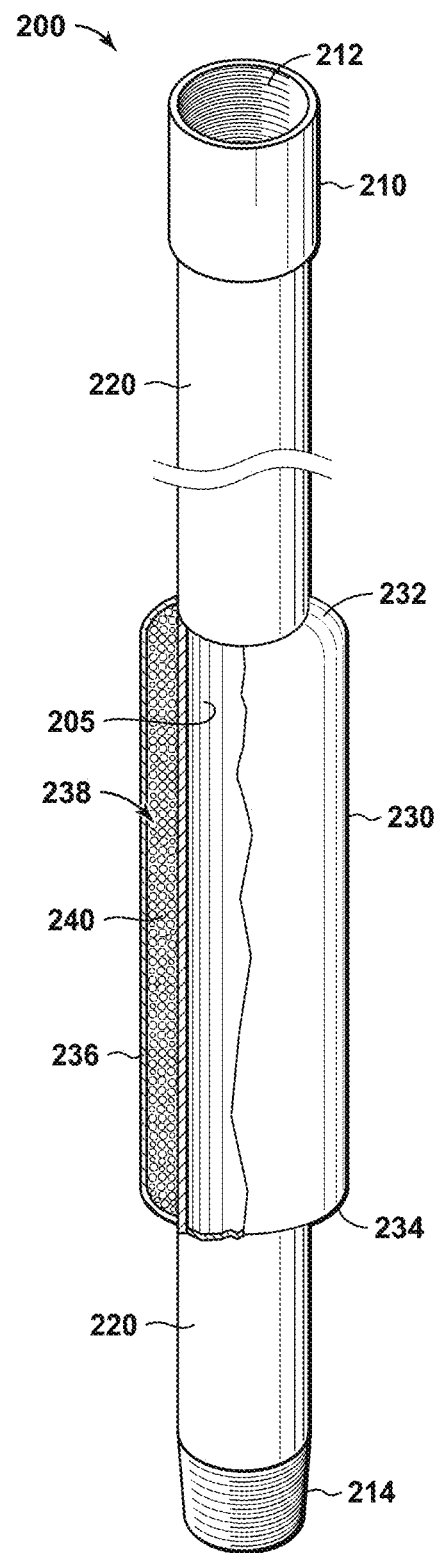
FIG. 2B is a perspective, cut-away view of a filter screen placed on the tubular body of FIG. 2A. The filter screen holds a plurality of compressible particles.

FIG. 2B is a perspective, cut-away view of the screen 230 of FIG. 2A. The screen 230 is again fitted onto an elongated pipe joint 220. The pipe joint 220 may be deployed in a wellbore as part of a string of casing. The process of fitting the annular screen 230 onto the pipe joint 200 may involve wrapping the screen 230 around the pipe body 220 and then securing it through friction or heat melding. More preferably, the process involves sliding the annular screen 230 onto the pipe body 220 (over the pin end 214) and then welding the screen 230 onto the pipe body 220. In this instance, the screen 230 is fabricated from a metal material or at least has metal frame members or ribs for welding.

In FIG. 2B, an inner bore 205 of the pipe 220 can be seen. The pipe 220 may be fabricated from any steel material having burst and collapse pressure ratings suitable for a wellbore environment. Those of ordinary skill in the art will understand that with the advent of hydraulic fracturing, burst ratings of pipe (and particularly of production casing) are much higher than in older wells and may withstand pressures of up to 15,000 psi. Of course, when welding or otherwise securing the screen 230 onto the outer diameter of the pipe body 220 care must be taken not to compromise the integrity of the joint 200 as a pressure vessel by scoring the pipe 220.

As an alternative, the pipe body 220 may be fabricated from ceramic. In this instance, the screen 230 is preferably secured to the pipe body 220 through a mechanical connection such as a latch or raised surfaces.

An encased area 238 is provided within the screen 230. As noted above, the encased area 238 holds a plurality of compressible particles 240. Preferably, a sufficient number of compressed particles are used to fill (or substantially fill) the encased area 238. The outer surface 236 of the filter screen 230 and the compressible particles 238 are designed to be sturdy enough to hold a cylindrical shape around the pipe body 220 until a designated annular pressure is reached. Once the designated annular pressure is reached, the compressible particles 240 will begin to collapse, thereby absorbing pressure within the annular pressure and reducing the likelihood of the pipe 220 collapsing during production operations.

As noted, the screen 230 may be fabricated from a polymeric material having micro-pores. In this instance, when the designated annular pressure that causes compression or collapse of the compressible particles 240 is reached, the porous, polymeric body 236 may at least partially collapse around the compressed particles 240. Preferably, the collapsibility response (or pressure rating) of the particles 240 is less than the collapsibility response (or pressure rating) of the screen 230, though this is a matter of engineer's choice.

Figures 3A, 3B:
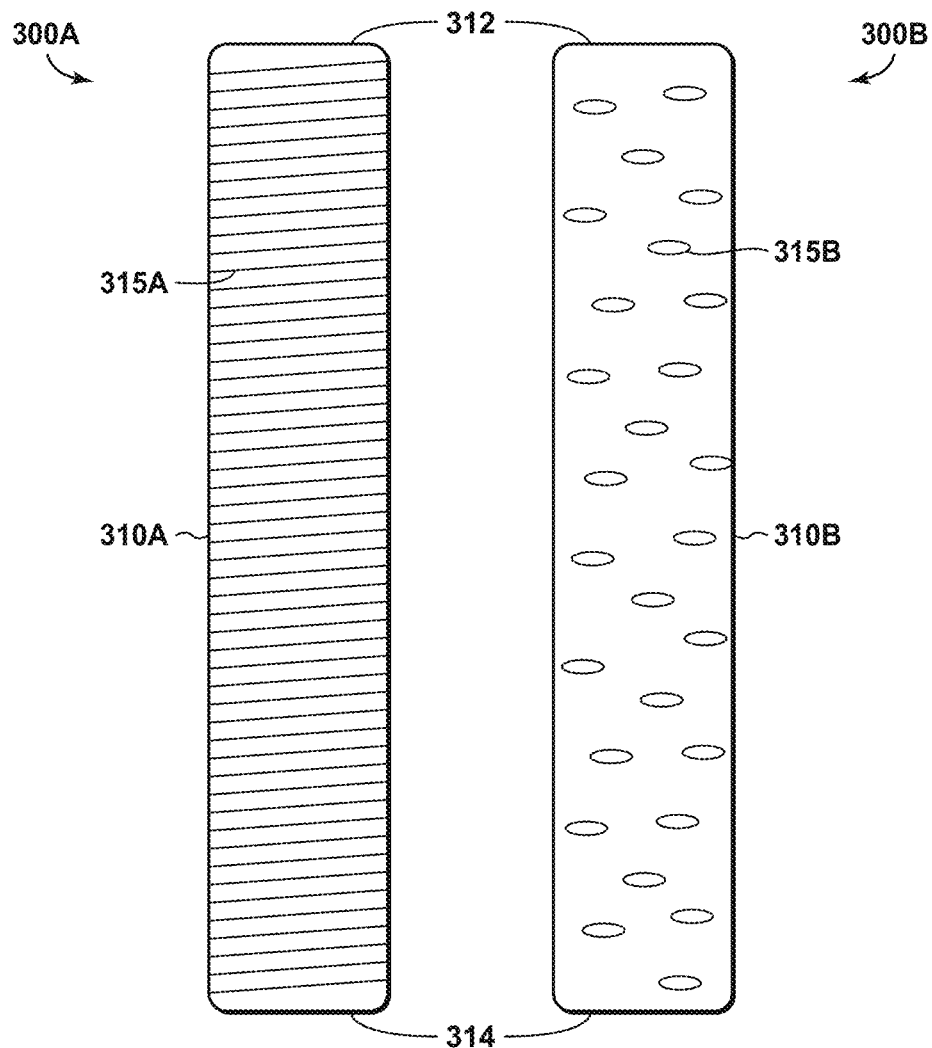
FIGS. 3A and 3B present side views of filter screens in alternate arrangements. Either filter screen may be fitted around an outer body of a joint of casing, and at least partially filled with compressible particles.

FIGS. 3A and 3B present alternate embodiments of an annular filter screen 230. FIG. 3A presents the screen as a wound filter screen 300A. The filter screen 300A is similar to a known sand screen. The filter screen 300A may be fabricated from either steel (or any corrosion-resistant alloy) or ceramic. Preferably, the filter screen 300A is fabricated from metal wire 310A that is wound around and supported by elongated vertical ribs (not visible). Micro-slots are preserved between the wire 310A to enable pressure communication into the containment area 238.

FIG. 3B presents the filter screen 300B as a slotted tubular. The filter screen 300B defines a metal tubular body 310B with a plurality of dedicated slots 315B. The slots 315B again enable pressure communication into the containment area 238.

Each filter screen has an upper end 1 and a lower end 314. The filter screens 300A or 300B are designed to be fitted around an outer diameter of the pipe 220 and filled with compressible particles 240. Each filter screen 300A or 300B will present slots 315A, 315B that permit fluid and pressure communication between the wellbore and the compressible particles. The gap size of the slots 315A, 315B in the screens 300A, 300B may range in size from 10 μm to 100 μm, depending on the specific particle size distribution. At the same time, the particle size distribution will be between 10 μm and 700 μm (dry). It is understood that the gaps 315A, 315B must be smaller than the diameters of the compressible particles 240.

Use of the screen 230 (or screens 300A or 300B) enables the delivery of the compressible particles 240 within a "trapped annulus." In this respect, it is not necessary to pump compressible particles 240 ahead of the cement column (e.g., column 145) for placement within the annular area (e.g., annular area 142). Extending the length of the screen 230 and/or increasing the density of the particles 240 within the containment area 238 and/or using multiple tubular bodies 200 increases the pressure absorption abilities within a trapped annulus 142, 152.

It is also noted that the use of the tubular body 200 with a screen 230, 300A or 300B enables the operator to place the particles 240 in a specific location in the trapped annulus. For example, the operator may desire to keep the compressible particles central to the trapped annulus. In this instance, the operator may place one or more tubular bodies 200, in series, generally half way between the top and the bottom of the fluid column making up the trapped annulus.

It is preferred that the filter screen 230, 300A or 300B cover about 80% of the length of the pipe body 220. The operator may place one, two, or even ten tubular bodies 200 having the filter screen 230, 300A or 300B along an annular region 142. The tubular bodies 200 may be connected in series, or may be spaced apart by placing standard casing joints between tubular bodies 200.

Figure 4:
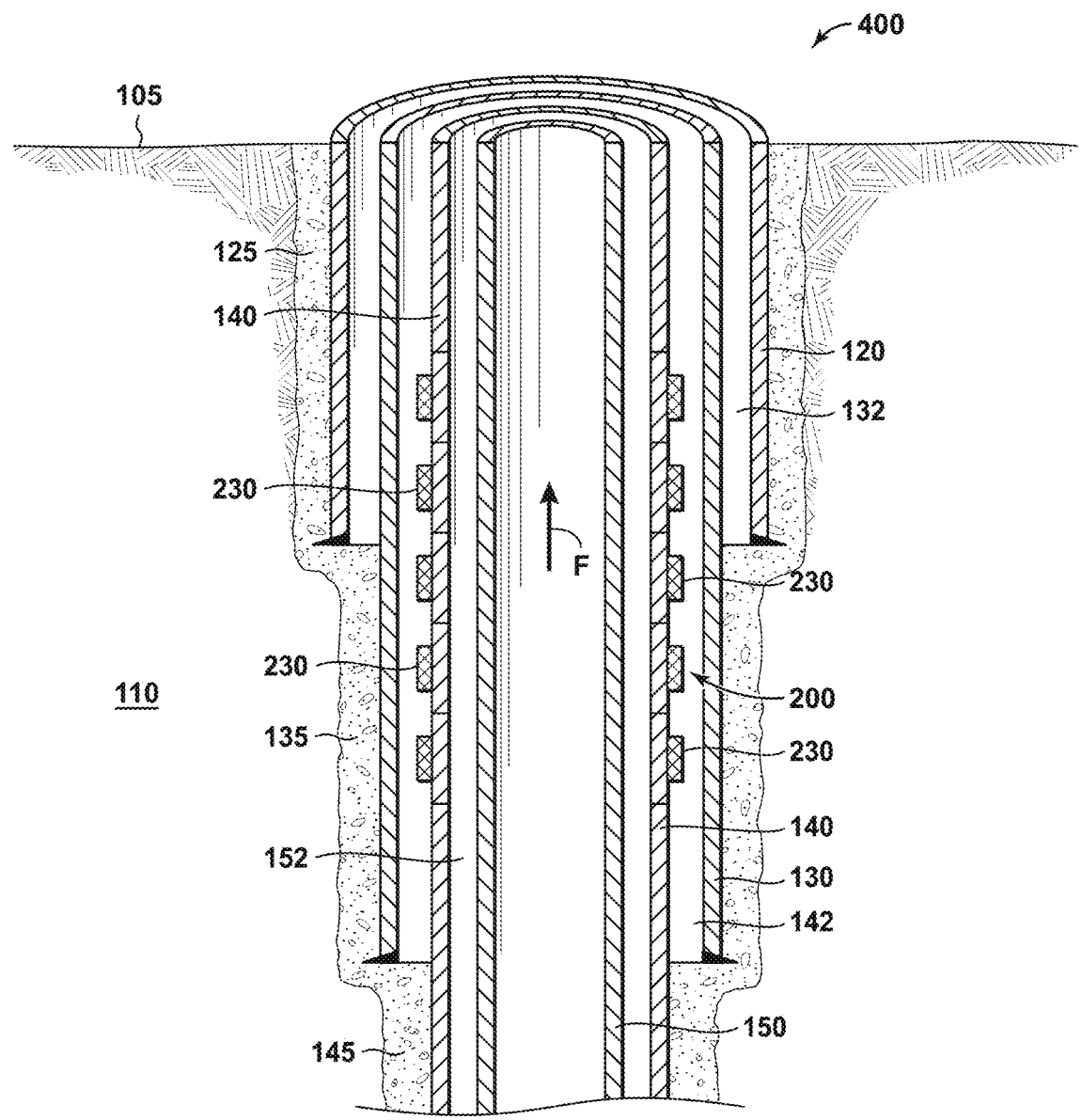
FIG. 4 is a perspective view of the upper portion of a wellbore having trapped annuli. An intermediate string of casing has received a series of filter screens, such as either of the filter screens of FIG. 3A or 3B.

FIG. 4 is a perspective view of the upper portion of a wellbore 400. The wellbore 400 is in accordance with the wellbore 100 of FIG. 1B. In this respect, the wellbore 400 is completed with a series of casing strings including surface casing 120, intermediate casing strings 130 and 140, and production casing 150.

In FIG. 4, Arrow F is shown. This indicates a flow of production fluids during a hydrocarbon production operation. It is understood that the production fluids are produced through a production string (not shown). The production fluids "F" are warm, causing a temperature within the various annular regions 132, 142, 152 to increase. This, in turn, will increase the temperature of the fluids within these annular regions 132, 142, 152. The increase in temperature within the defined volumes will cause a corresponding increase in pressure.

To accommodate the pressure increase within the trapped annulus 142, a series of novel tubular bodies 200 is provided. Each body includes a permeable filter screen 230 containing a plurality of compressible particles 240. The particles 240 are preferably fabricated from compressive carbon beads such as mesocarbon micro-beads. Mesocarbon micro-beads ("MSMB's") represent a porous graphite carbon (PGC) material wherein an inner core is composed of amorphous carbon, while an outer shell is composed of graphitic carbon. Both the inner core material and the outer shell material are porous.

MCMB's may be fabricated from coal tars. In one aspect, a surface-coated micro-bead material may be produced by carbonizing thermosetting resin. Such beads are available under the trade name NicaBeads® and are produced by Nippon Carbon Co. Ltd. of Tokyo, Japan.

Other materials may also be used for the compressible particles 240. For example, a composite of polymer and graphite may be formed into beads. The graphite material may include graphite carbons. Such materials are available from Superior Graphite Co. of Chicago Ill. Alternatively, graphene beads having a high porosity to enhance compressibility may be used. Pore channels within the beads may optionally be coated with natural rubber or a polymer or pseudo-polymer serving as a synthetic rubber.

In one arrangement, flexible compressible beads comprised of a polymeric material are used. For example, a co-polymer of methylmethacrylate and acrylonitrile may be used. Styrofoam or polystyrene may also be used alone or in combination with this co-polymer. In another embodiment, a terpolymer of methylmethacrylate, acrylonitrile and dichloroethane is used. The dichloroethane may be a vinylidene dichloride. Preferably, the beads are not infused with gas so as to limit expansion of the bead material upon exposure to heat during wellbore operations.

Other polymeric materials may be used such as neoprene, polyurethane rubber, vinyl, nitrile rubber, butyl rubber, EPDM rubber, silicone rubber, or combinations thereof. The material may be continuous or it may be porous, having a porosity of 5% to 40%, or more preferably between 10% and 20%. It is understood that the above materials are merely illustrative.

Preferably, the particles will have a compressibility of between 10% and 30%. More preferably, the particles will have a compressibility of between 14% and 22% (up to 10,000 psi).

Preferably, each of the particles has a resiliency of between 80% and 120%. More preferably, each of the particles has a resiliency of between 87% and 117%.

As noted, the particles 240 are confined within a containment area (shown at 238 in FIG. 2) defined by a filter screen. In FIG. 4, the wellbore 400 has received a series of tubular bodies 200, each having an elongated filter screen 230. While the screen is indicated as element 230, the screen may alternatively be filter screen 300A of FIG. 3A or 300B of FIG. 3B. The use of a filter screen 230 allows the operator to select the depth at which the particles 240 are placed along the trapped annulus without having to worry that the particles may float to the top of the column or settle to the bottom of the column along the trapped annulus 142. Stated another way, the operator can use particles 240 having a desired compressibility without worrying about bed heights at the bottom or the top of the annulus 142. Since the particles 240 are contained, the bed height is generally pre-determined by the height of the filter screen 230 and the number of tubular bodies 200 employed in series. Further, the operator may be less concerned with particle density since buoyancy is not a factor.

In the embodiment described in FIG. 4, the compressible particles 240 are contained within one or more annular screens 230 placed around a pipe joint 220, (e.g., a joint of casing). However, an alternative solution to alleviating pressure build-up in an annular area (such as area 142) is to use collapsible particles dispersed in the fluid residing along the fluid column in the annular area. Once again, the particles are volumetrically compressed as the pressure increases during production operations, resulting in additional volume into which the fluid can expand. This may be in lieu of or in addition to use of tubular bodies 200.

Figure 5A:
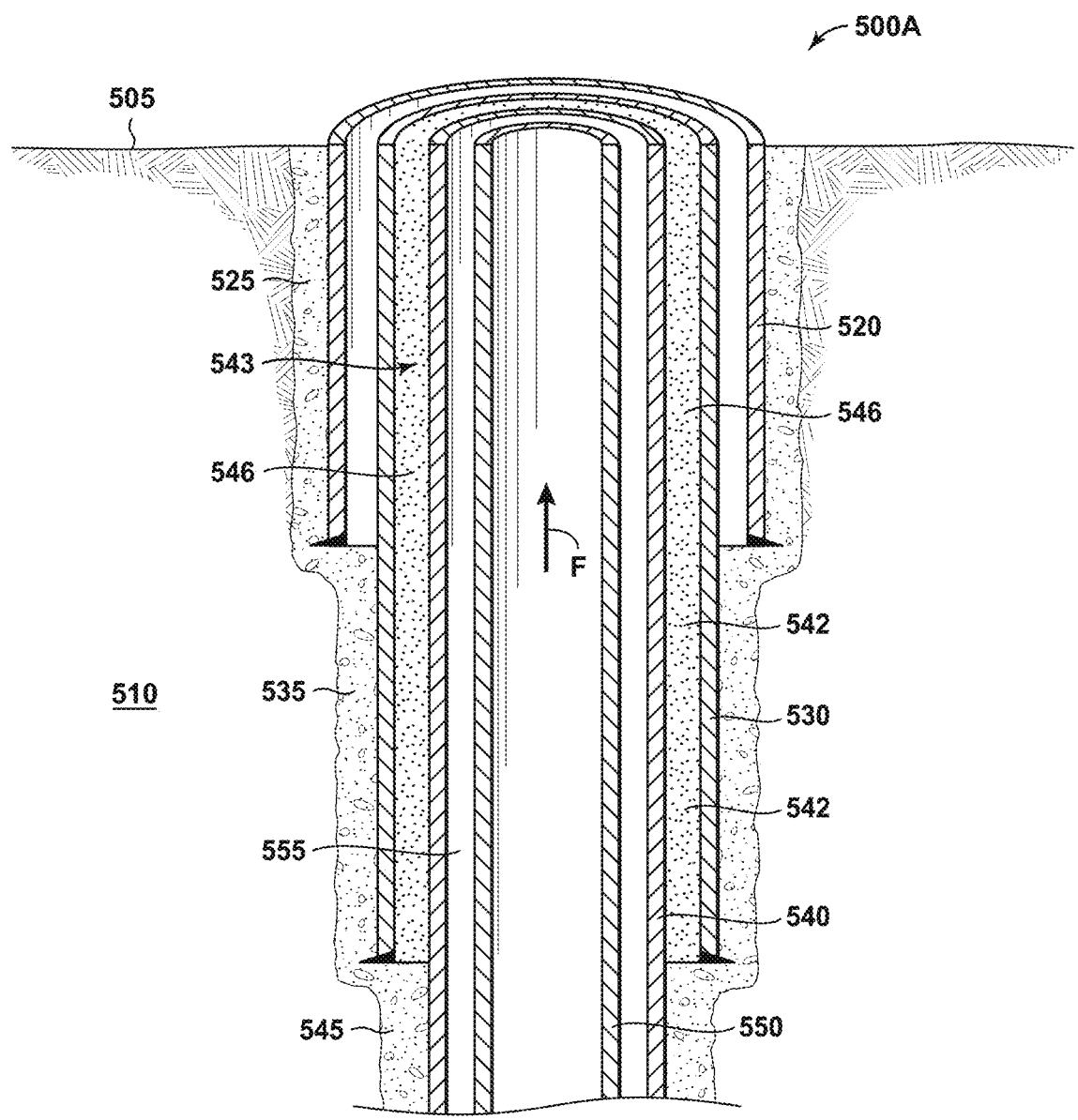
FIG. 5A is another perspective view of the upper portion of a wellbore, in an alternate embodiment. In this instance, a column of carrier fluid holding compressible particles is placed in the unfilled annular space around an intermediate string of casing. The compressible particles are suspended in and dispersed along the column of carrier fluid.

FIG. 5A presents a cross-sectional view of the upper portion of a wellbore 500A. The wellbore 500A extends into a subsurface formation 510. As with wellbore 400 of FIG. 4, wellbore 500A has been completed with a series of casing strings. These include a surface casing string 520 and at least two intermediate casing strings 530 and 540. In addition, a production casing 550 is used, providing for a "cased hole."

Annular area 525 resides around the surface casing string 520. Similarly, annular areas 535 and 545 reside around casing strings 530 and 540, respectively. Additionally, annular area 555 resides around production casing 550. Cement is placed around the lower portions of annular areas 535 and 545. Preferably, cement is also placed around at least a lower portion (not shown) of annular area 555 up to a bottom of casing string 540. In the illustrative view of FIG. 5A, only annular area 525 is completely filled with cement.

It is observed that in the wellbore 500 no annular screen is used as in FIG. 4; instead, a column of carrier fluid 543 holding compressible particles 546 is used. The carrier fluid 543 resides in an annular area 545 around the production casing 540, forming a fluid column or bed. The carrier fluid 543 is placed in what will otherwise be a "trapped annulus" 542 above a column of cement 545.

In the arrangement of FIG. 5A, the compressible particles 546 are suspended in and dispersed somewhat evenly along the column of carrier fluid 543. During production, hydrocarbon fluids are lifted to a surface 505 in accordance with Arrow F using a production tubing (not shown). Formation fluids may flow to the surface 505 under in situ pressure; alternatively, formation fluids may be raised to the surface 505 using an artificial lift technique. In either instance, as formation fluids are produced according to Arrow F, the temperature in the wellbore 500A will increase. This, in turn, will increase pressure within the trapped annulus 542 due to fluid expansion.

To alleviate this pressure and to protect the adjacent casing strings 530, 540, the particles 546 are volumetrically compressed. This results in additional volume into which the fluid can expand as the pressure increases during production operations.

To maximize the effectiveness of the compressible particles 546, it is ideal if all of the particles 546 are exposed to pressure within the trapped annulus 542 equally. In this way the particles 546 can compress proportionally. This may not be achieved if all of the particles 546 rise together to the top of the trapped annulus 542. In this respect, at least some of the particles 546 will be lost during the periodic annulus bleed downs that occur during production operations.

Similarly, it may be undesirable for the particles 546 to settle together at the bottom of the fluid column 543, forming a bed. Such a bed would represent a collection of particles 546 which, depending on the number of particles used and the height and area of the annulus 542, could prevent pressure contact across all of the fluid column 543. Stated another way, fluid pressure may not fully penetrate through the entirety of the bed height. In addition, if the particles 546 settle tightly anywhere along the column 543 they could build an impermeable bridge resulting in trapping that, without the addition of the compressible particles 546, was an open annulus along the column 543, thus creating a problem where previously none had existed.

To ensure that the particles 546 remain well-dispersed along the annular column 543, consideration should be given to the density of the particles 546 relative to the carrier fluid 543. A lower density can be achieved by designing large particle size, increased pore volume, or providing random shapes that mitigate packing. It is believed that irregular particle shapes with higher surface area allows for better suspension in the fluid column. Preferably, the density of the carrier fluid 543 is between 12 ppg and 12.8 ppg (1.43 g/cc to 1.54 g/cc) and the densities of the compressible particles 546 span across this range. In one aspect, the particles 546 may range in density from 0.5 to 2.5 specific gravity. A uniform suspension of particles 546 can be achieved by designing the carrier fluid 543 density to generally match the density of the particles 546 (or vice versa).

The particles 546 are preferably fabricated from a compressive carbon such as mesocarbon micro-beads or graphite as described above. Alternatively, a composite of polymer and graphite may be formed into beads.

In one arrangement, flexible compressible beads comprised of a polymeric material are used. For example, a co-polymer of methylmethacrylate and acrylonitrile may be used. Styrofoam or polystyrene may also be used alone or in combination with this co-polymer. In another embodiment, a terpolymer of methylmethacrylate, acrylonitrile and dichloroethane is used. The dichloroethane may be a vinylidene dichloride. Preferably, the beads are not infused with gas so as to limit expansion of the bead material upon exposure to heat during production operations.

Consideration should also be given to particle size. The compressible particles 240 may range in size from 10 μm to 700 μm in diameter, and more preferably between 40 μm and 700 μm. In one aspect, at least 50% of the compressible particles have a diameter range that is from 50 μm to 600 μm, with an average size that is between 200 μm and 400 μm (in dry state).

The slots 310A or 310B are sized to contain the particles 546 while allowing ingress of fluid and pressure. During operation, pressure need only migrate from the O.D. of the screen 300A or 300B where the fluid is present to the O.D. of the pipe joint 220.

Figure 6:
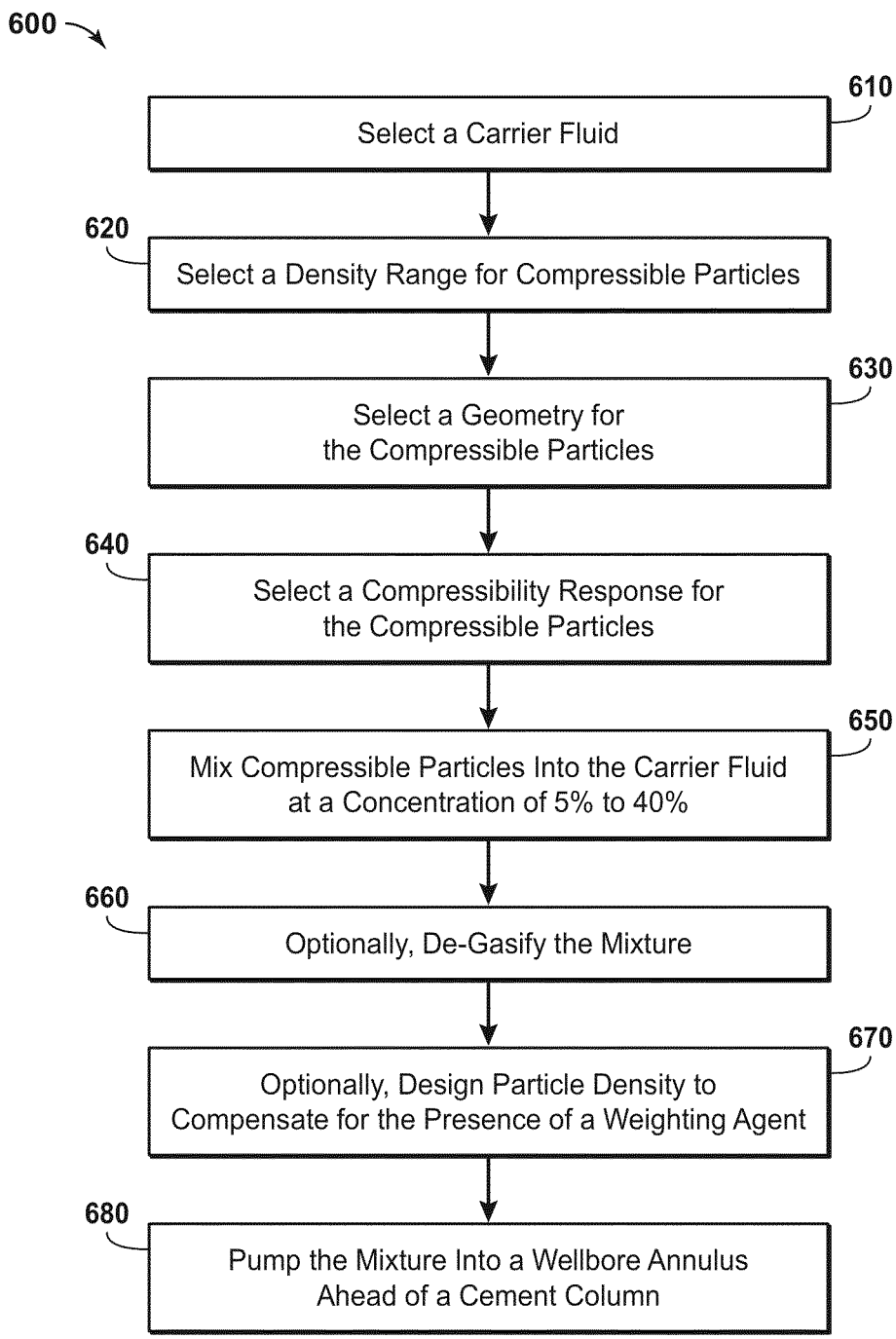
FIG. 6 is a flow chart showing steps for preparing a mixture of compressible particles for a wellbore annular area.

FIG. 6 is a flow chart showing steps for a method 600 of designing a mixture having compressible particles. The mixture will be comprised of the carrier medium 543 and the compressible particles 546. The aim of the method 600 is to provide for a desired distribution of particles 546 across a trapped annulus 542.

The method 600 first includes selecting a carrier fluid. This is shown in Box 610. The carrier fluid is preferably an aqueous liquid comprised primarily of fresh water, salt water or brine. Water based drilling fluid may also be considered wherein the drilling fluid comprises a weighting agent. Weighting agent particles are shown at 1130 in FIG. 11B.

Fresh water, of course, has a specific gravity of 1.0. Where salt or minerals are present, the specific gravity will be increased. The carrier fluid may need to be blended to ensure a generally homogenous composition and specific gravity.

The method 600 next includes selecting a density range for the compressible particles 546. This is provided in Box 620. The particles 546 may have a range in density from 12.0 ppg to 12.8 ppg. Ideally, the compressible particles 546 will have a specific gravity ("SG") that is close to that of the carrier fluid 543. Preferably, the SG of the compressible particles 546 will have a range of plus/minus 0.5 of the carrier fluid 543. This will prevent particles from settling at the bottom or rising to the top of the narrow annulus 542, forming a bed that isolates the annulus (or at least many of the particles) from pressure.

In the narrow confines of an annulus 542, forming a dense particle bed at the top or bottom of the annulus could be detrimental. In this respect, as the particles bridge off they will limit the fluid's pressure penetration from one end of the bed to the other end of the bed. The consequence is that not all particles would be compressed as the pressure increases in the trapped annulus 542. If all of the particles 546 settle at the bottom of the column 543 where an open shoe was present, the bed could restrict pressure distribution up into the fluid column 543.

Figure 5B:
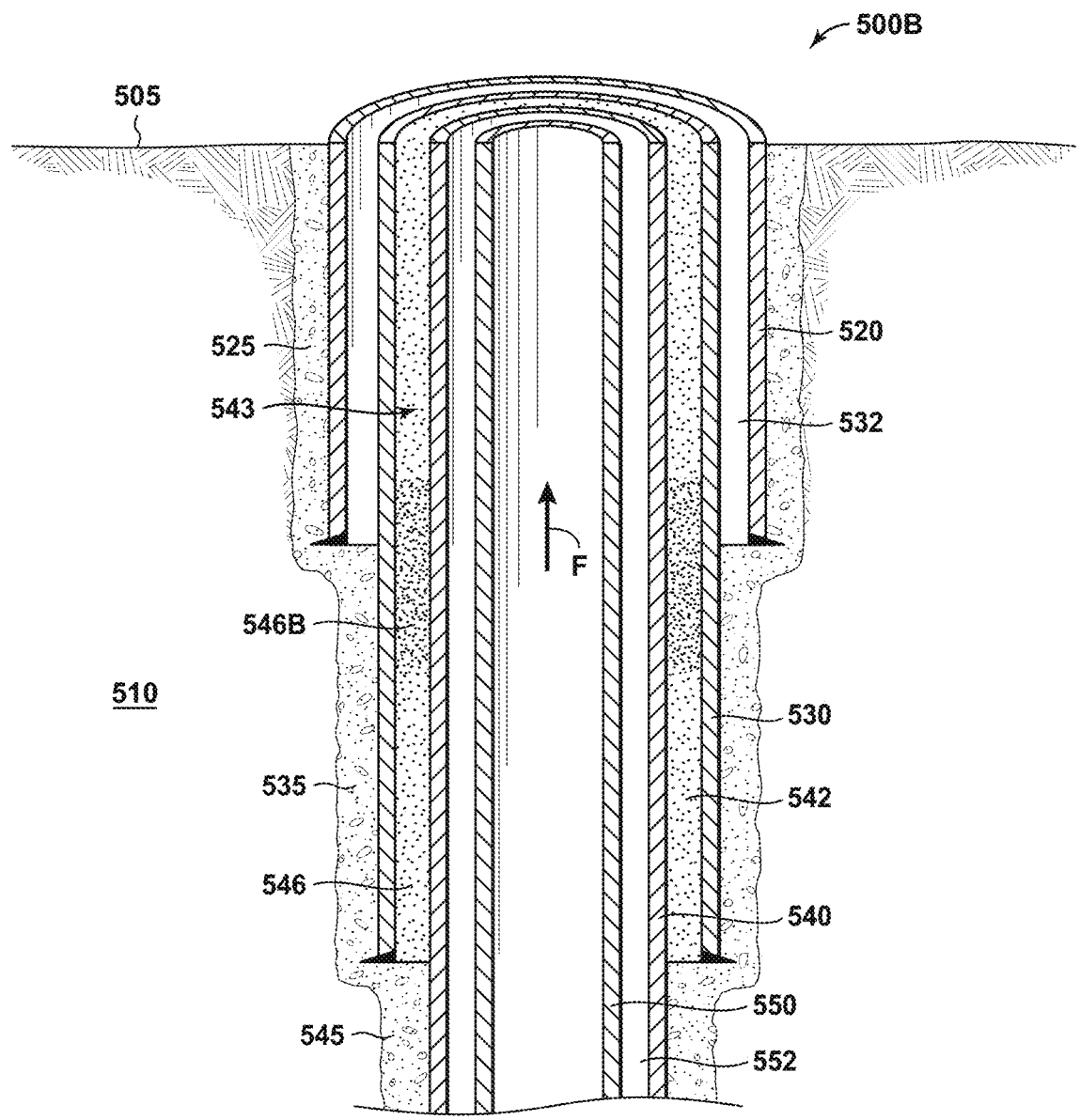
FIG. 5B is still another perspective view of the upper portion of a wellbore. In this instance, a column of carrier fluid holding compressible particles is again placed in the unfilled annular space around an intermediate string of casing. The compressible particles are suspended more densely central to the trapped annulus.

Notwithstanding the arrangement of FIG. 5A, in some instances the operator may want to cluster a majority of the particles 546 central to the trapped annulus 542. FIG. 5B is another perspective view of the upper portion of a wellbore 500B. The wellbore 500B is constructed in accordance with the wellbore 500A of FIG. 5A and extends into the subsurface formation 510. A column of carrier fluid 543 holding compressible particles 546 is again placed in the unfilled annular space 542 around an intermediate string of casing 540. The compressible particles 546 are suspended together within and dispersed along the column of carrier fluid 543.

In FIG. 5B, the concentration of particles 546 is higher along a central portion 546B of the annular region 542 than it is near the bottom. This is due to an intentional variation of the density of the particles 546 as mixed in the carrier fluid 543. One way of adjusting the location of the particles 546 along the trapped annulus 542 is by increasing or decreasing the porosity of the particles. Some particles having a lower density are included, which will generally rise to the top of the fluid column 543, while some particles having a higher density will be included which will generally settle to the bottom of the fluid column 543. In the arrangement of FIG. 5B, the particles 546 are generally dispersed along the fluid column 543, but a higher percentage of particles have a SG that approximates the density of the carrier medium 543, causing most of the particles 546 to settle along the central portion 546B.

Figure 7A:
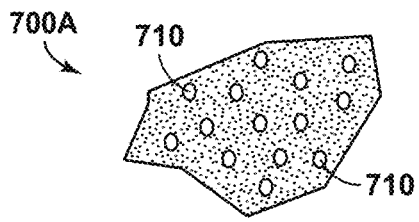
FIG. 7A is a top view of an illustrative compressible particle as may be used in an annular region of a wellbore, in a first embodiment.

FIG. 7A is a top view of an illustrative compressible particle 700A as may be used in an annular region 542 of a wellbore, in a first embodiment. Here it can be seen that the particle 700A has a number of holes 710. The holes 710 increase porosity and create buoyancy. The holes 710 may further enhance compressibility response.

The compressible particle 700A shown in FIG. 7A is preferably a carbon or carbon-based material. More preferably, the material comprises graphene, representing carbon material placed in layers. Graphene particles are shown to provide low-density, high compressibility and high elasticity. In addition, graphene particles can have resistance to fatigue. In one aspect, a carbon-graphene composite compound of arched structures arranged into parallel stacks is used.

Figure 7B:
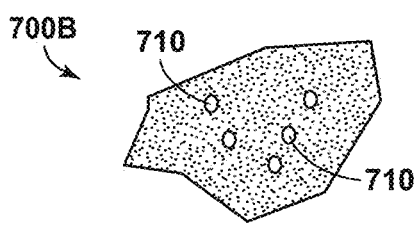
FIG. 7B is a top view of an illustrative compressible particle as may be used in an annular region of a wellbore, in a second less porous embodiment.

FIG. 7B is a top view of an illustrative compressible particle 700B in an alternate embodiment. In this arrangement, the particle 700B has fewer holes 710, indicating a lower porosity (or higher density). Again, the particle 700B may be a carbon-graphene composite.

With reference again to FIG. 5B, particles in accordance with particle 700A and particles in accordance with particle 700B are used in the carrier fluid 543. Particles 700A have a lower relative density and are clustered near the top of the annular column while particles 700B have a relatively higher density and settle more readily along the fluid column 543, extending to the bottom.

It is noted that the illustrative particles 700A and 700B have irregular profiles. The irregular profiles are polygonal, or multi-sided. Particles having a variety of outer diameters, profiles and specific gravities may be employed to prevent excessive packing during pressurization. This enables pressure communication with the entire outer surface of each particle 700A, 700B.

Figure 7C:
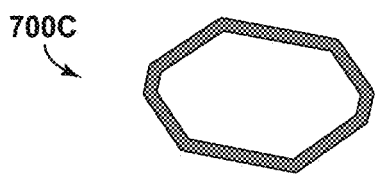
FIG. 7C is a top view of an illustrative coating that may be used around a compressible particle.

FIG. 7C is a side view of a coating 700C that may optionally be used around a compressible particle, such as particle 700A or 700B. The coating 700C may be applied by dipping the particles 700A, 700B into a vat containing a liquefied coating material. The coating material may comprise, for example, natural rubber, synthetic rubber or a thermoplastic elastomer. An example of a thermoplastic elastomer is vinylidene fluoride-hexafluropropylene co-polymer. The coating will have its own porosity, aiding in the compressibility and buoyancy of the particles 700A, 700B.

As an alternative to the coating process, compressible particles 700A, 700B may be placed on a screen or tray and passed under a spray of warmed elastomeric coating material. As the particles 700A, 700B pass through or under the spray of the warmed elastomeric coating material, the coating 700C is applied to the compressible particles 700A, 700B. The particles 700A, 700B are then gently shaken or mixed to ensure that the particles 700A, 700B do not adhere to each other as the polymer coating dries. The particles 700A, 700B may be passed through a cooling station to congeal the polymeric material, or may be run through a drying station wherein blowers are used to blow air across the compressible particles 700A, 700B.

Returning again to FIG. 6, the method 600 additionally includes selecting a geometry for the compressible particles. This is seen in Box 630. Geometry refers to both shape and size.

The compressible particles may range in size from 10 pinto 700 μm in diameter, depending on the specific particle size distribution. More preferably, the particle size distribution will be between 100 μm and 700, or even between 200 μm to 400 μm.

Particles having a variety of outer diameters and a variety of specific gravities are preferably employed to prevent packing during pressurization. In one aspect, particles have irregular sides such as shown with particle 700A are used. In another aspect, particles having different shapes may be employed to prevent packing. For example, some particles may have a circular profile while others may have an oval profile.

Figure 8A:
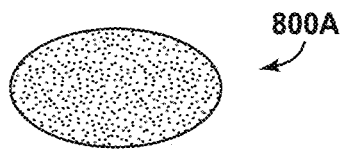
FIG. 8A is a top view of an illustrative compressible particle. The particle presents a geometry having a smooth outer surface and an oval profile.

FIG. 8A is a top view of a compressible particle 800A. The particle 800A presents a geometry having a smooth outer surface. In this view, the profile is oval. As an alternative, the profile could be circular.

Figure 8B:
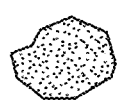
FIG. 8B is another illustrative compressible particle. Here, the particle has an irregular shape.

FIG. 8B is a top view of another illustrative compressible particle 800B. Here, the particle 800B has an irregular shape. Particle shape may be adjusted to selectively increase or decrease the degree to which particles "fit together" while undergoing compressive forces downhole.

Figure 9A:
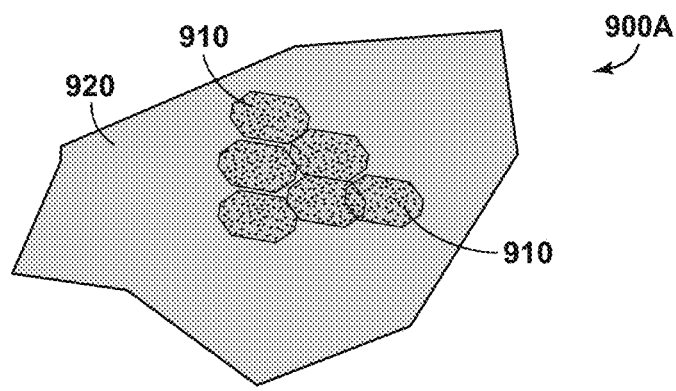
FIG. 9A is a sectional view of a carrier fluid wherein compressible fluids are suspended. The carrier fluid has received a plurality of regularly-shaped, polygonal compressible particles.

FIG. 9A is a sectional view of a carrier fluid 920. In this view, a collection 900A of compressible particles 910 is suspended in the carrier fluid 920. Of interest, the illustrative particles 910 share the same shape, each having a polygonal profile. The particles 910 are compressed together due to pressure build-up within a trapped annulus.

Here, the particles 910 are compressed into an agglomeration. This is in response to compressive forces acting within a trapped annulus.

Figure 9B:
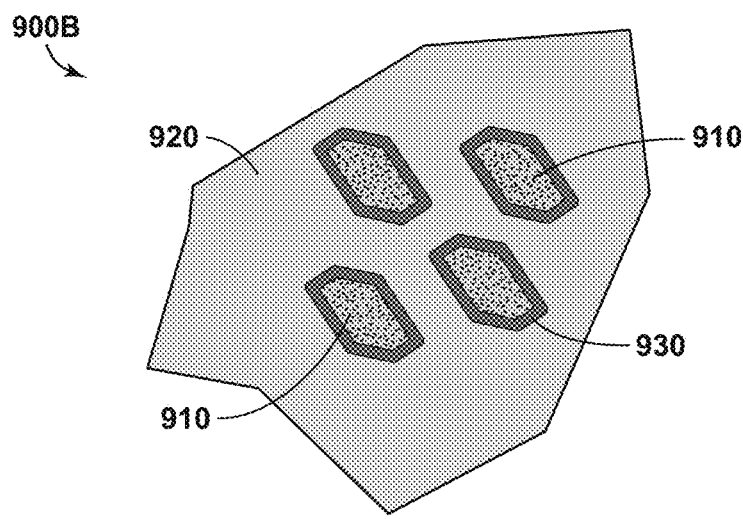
FIG. 9B is another sectional view of a carrier fluid wherein compressible fluids are suspended. In this view, a coating has been applied to the compressible particles. The coating is charged, causing the particles to repel each other, thereby enhancing disbursement.

FIG. 9B is a second illustrative view of a collection 900B of the compressible particles 910 in a carrier medium 920. Here, the particles 910 each have a coating 930. Either the particles themselves 910 or the coating 930 includes an electrical or magnetic charge that causes the particles 910 to repel one another. This inhibits packing of the particles 910 within the wellbore. This also inhibits settling of the particles 910 within the annulus, enabling the particles 910 to remain well dispersed along the fluid column 543 in spite of pressure build-up. Stated another way, the coating 930 mitigates formation of a pressure impenetrable bed after particle settlement.

The coating 930 may be applied during finishing operations of the collapsible particle manufacturing as to not disrupt the mechanical properties and structure of the particles 910. The coating 930 may be engineered to ensure compatibility such that interaction of surface coating chemicals and downhole chemicals used in the carrier fluid 920 is not detrimental and so that the coating 930 maintains its utility during lifecycle of particle utilization.

Engineering the collapsible particle size and shape will allow for buoyancy in the fluid column. Smaller particle size and irregular particle shape with higher surface area will allow for better suspension in the fluid column 543.

Returning to FIG. 6, the method 600 further includes selecting a compressibility response for the compressible particles. This is shown in Box 640. Compressibility may be measured in terms of volumetric change per pressure change (dV/dP). Preferably, the compressibility response is between 0.5 mm and 1.0 mm/100 psi. Alternatively, each of the compressible particles has a compressibility of between 14% and 22% (up to 10,000 psi). The particles may also have a resiliency of between 87% and 117%.

Figure 10A:
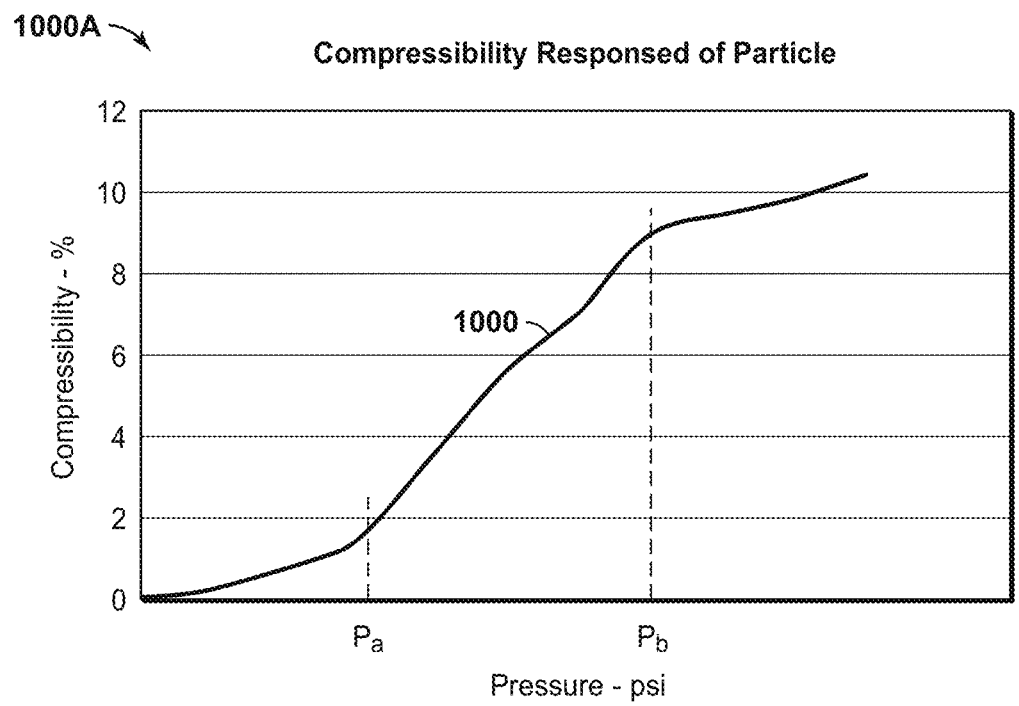
FIG. 10A is a cartesian chart showing compressibility of particles as a function of pressure. This demonstrates a "compressibility response."

FIG. 10A is a Cartesian chart 1000A showing compressibility of a particle. Compressibility is indicated along the y-axis as a percentage of volumetric change, while pressure (measured in psi) is shown on the x-axis. Line 1000 demonstrates a compressibility response of a particle as pressure increases. To maximize the effectiveness of compressible particles, the pressure acting on those particles ideally would be within the area of a compressibility curve that maximizes the volumetric change per pressure change (dV/dP). In FIG. 10A, this resides within $P_A$ and $P_B$.

The compressible particles, when suspended in a carrier fluid, should be placed within the annulus such that the predicted pressure P at the position of placement is within the maximum dV/dP capabilities of the particle. This would be within the range between $P_a$ and $P_b$. $P_a$ would be the initial pressure state of the annulus before the annulus builds up pressure. $P_b$ represents a final pressure state of the annulus after productions operations have commenced and the wellbore has warmed.

The depth of this pressure range $P_a$-$P_b$ can be found by calculating the expected pressure profile within the annulus. The end result of this is that compressible particles 546 are placed to maximize the effectiveness of their compressibility response.

Figure 10B:
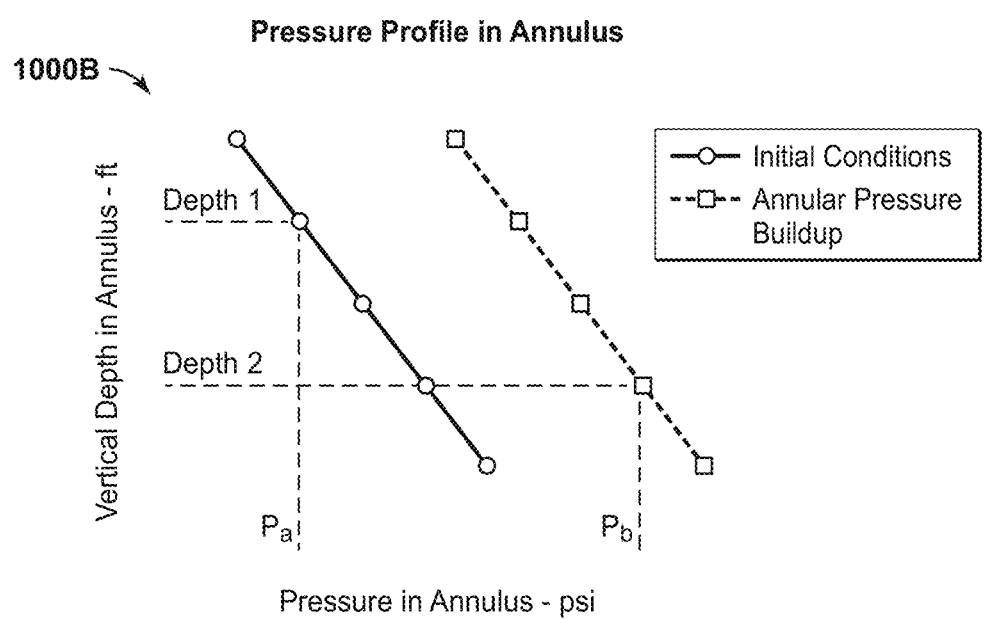
FIG. 10B is a graph showing a pressure profile within the annular region of a wellbore. Pressure is shown as a function of depth, both before and after pressure build-up due to production operations.

FIG. 10B is a graph 1000B showing a pressure profile within the annular region of a wellbore. Vertical depth within the annulus is shown on the y-axis, measured in feet, while pressure in the annulus is shown on the x-axis, measured in psi. Once again, the pressure values $P_A$ and $P_B$ are indicated, meaning pressure both before and after pressure build-up.

Two different depths are shown in FIG. 10B, referenced as Depth 1 and Depth 2. Depth 1 indicates an upper portion of a trapped annulus while Depth 2 indicates a lower portion of a trapped annulus. Depth 2 is obviously lower than Depth 1.

As depth within the annulus increases, the pressure increases. This suggests that the depth of particle placement should be tuned to maximize the compressibility response of the particles. Thus, particles with a higher degree of compressibility should be placed closer to Depth 1 while particles with a lower degree of compressibility should be placed closer to Depth 2.

As an aside, where screens (such as screen 230) are used, the operator may choose to place particles having a higher degree of compressibility in screens residing at shallower locations along the wellbore. Reciprocally, the operator may choose to place particles having a lower degree of compressibility in screens residing along joints that are at or deeper locations along the wellbore.

Where the filter screens are not used, the operator may use staged fluid displacements to place particles having different compressibilities along the annular region. This means that the operator will pump down carrier fluid carrying particles having a higher degree of compressibility first, followed by particles having a slightly lower degree of compressibility second, followed still by particles having an even lower degree of compressibility third, and so forth. Preferably, no more than three stages would be employed.

As another option, the particles may have different densities, corresponding to their compressibility responses. Some particles will have a lower density and a higher compressibility response. Still others will have a slightly lower density and a slightly higher compressibility response. At the same time, some particles will have the highest density and the lowest compressibility response. All of these particles may be mixed together (shown at Box 650) before pumping.

Once the carrier fluid 543 is placed within the annulus 542, some re-settling of particles 546 will take place. Particles 546 having the lowest density will slowly rise to the top of the column 543 while particles 546 having the highest density will slowly settle towards the bottom.

In one aspect, particles having higher degrees of compressibility will be designed with a lower density. Similarly, particles having lower degrees of compressibility will be designed to have a higher density. In this way, all compressible particles may be pumped into the annular region together ahead of a cement slurry, with the understanding that the particles will at least partially re-settle themselves according to their respective densities. Density may be adjusted, for example, by increasing or decreasing porosity.

As a third option, the operator may choose to deliberately place particles within an annular region 542 in stages. Particles 546 with a lower density and a higher compressibility response will be pumped down first. This would be followed by particles 546 with a slightly lower density and a slightly higher compressibility response. Particles 546 having the highest density and the lowest compressibility response would be pumped down last, just ahead of the cement. In this arrangement, two to five stages of fluid displacement may be employed.

In any instance, where a carrier medium 543 carrying compressible particles 546 is pumped down a wellbore (such as wellbore 500B), the operator will need to mix the particles into the fluid first. This is provided at Box 650. Preferably, the compressible particles 546 are mixed into the fluid 543 at a concentration of 5% to 40% by volume. The greater the concentration of particles there is, the greater the overall compressibility the fluid column 920 will have. Thus, overall compressibility is impacted not only by the degree of compressibility of the particles along the column 543, but also by the number of particles 546 provided.

In connection with the mixing step of Box 650, the operator may choose to add additives to the mixture in order to increase the rheological properties (e.g., plastic viscosity, yield point value, and gel strength) of the mixture. Such additives may include one or more natural and/or synthetic polymeric additives, polymeric thinners or flocculants. The purpose of such additives is to alter the gel strength of the fluid 543 to inhibit particle settling.

Alternatively, the operator may provide an electric or magnetic charge to the particles to keep them suspended. Alternatively still, the particles may be coated with a material having an electrical or magnetic charge to inhibit settling. Such an arrangement is shown in FIG. 9B discussed above.

It is observed here that the presence of gas in the carrier fluid 543 can inhibit the performance of the compressible particles 546. To improve the performance of the compressible particles 546, the carrier fluid 543 may be prepared such that the gas content is minimized. Thus, a step 660 of de-gasifying the mixture may be provided for the method 600.

One option for reducing gas content is through mechanical agitation or stirring. For example, the motor and impeller of a known "gas trap" apparatus may be employed. An example of such a gas trap is the Floatair® gas trap available from Floatair LLC of Carlsbad, N. Mex. Details concerning this gas trap are presented in U.S. Pat. No. 9,879,489, and are incorporated herein by reference. The gas trap may be floatably placed within a mixing tank, causing vapors to escape through the top of a mixing canister.

As another option, the mixture may be carried from a mixing tank that is held under pressure to a holding tank having less pressure, such as an open air tank. To aid in degasification, sonic energy may be applied to agitate the mixture through pulses that drive the gas out. For example, a mega-sonic energy transducer that generates between 900 kHz and 2.0 MHz may be used.

Alternatively or in addition, a hold time could be applied to the mixture before pumping into the wellbore in order to allow gases to come out of solution at ambient conditions. Additionally, gas content in the carrier fluid 543 may be reduced by applying a reductant, or reducing agent.

Referring back to FIG. 6, the method 600 may also optionally include adjusting particle density to compensate for the presence of a weighting agent. This is indicated at Box 670.

Those of ordinary skill in the art will understand that during the drilling of a wellbore, a weighting agent is typically used as part of the drilling fluid. The weighting agent increases the density of the fluid and, thereby, increases the hydrostatic head acting down on the drill bit and the surrounding formation as the drill bit rotates and penetrates downhole. The weighting agent helps act against high formation pressures that may "kick" into the wellbore. The weighting agent also forms a "cake" against the wellbore wall to prevent fluid loss during circulation.

Commonly-used weighting agents include barite and hematite. Weighting agent particles will remain in the wellbore after casing strings are run into the hole. This means that as the fluid mixture (that is, the carrier fluid 543 with compressible particles 546) is pumped downhole, the mixture will likely pick up weighting agent particles en route to the annular area 542. This will affect the buoyancy of the compressible particles 546.

Figure 11A:
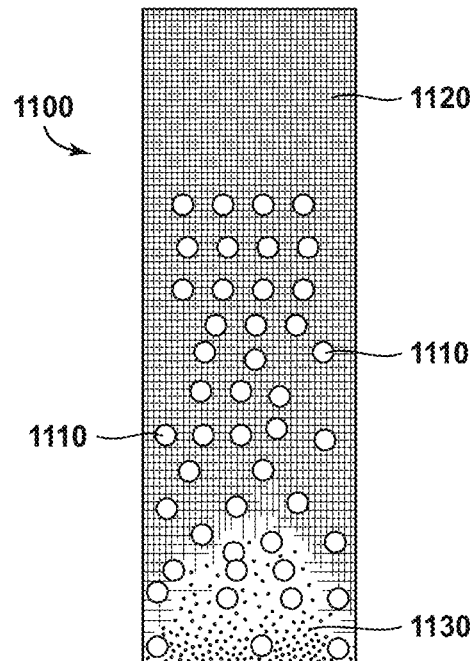
FIG. 11A is an illustrative view of an annular region, representing a small portion of an annular column for a wellbore. The annular region holds a plurality of compressible particles suspended in an aqueous carrier fluid. The compressible particles are designed to have a density that is lower than the density of the fluid, thereby enabling buoyancy.

FIG. 11A is an illustrative view of an annular region 1100. The annular region 1100 represents a small portion of an annular column for a wellbore, such as the fluid column 543 of FIG. 5A. The annular region 1100 holds a plurality of compressible particles 1110. The particles 1110 are suspended in an aqueous carrier fluid 1120. The compressible (or collapsible) particles 1110 are designed to have a density that is lower than (or very close to) the density of the fluid 1120, thereby enabling buoyancy.

In the column 1100 of FIG. 11A, weighting agent particles 1130 can also be seen. Due to their weight, most of the particles 1130 have settled towards the bottom of the column 1100. At the same time, some of the weighting agent particles 1130 have attached themselves to the compressible particles 1110, causing the compressible particles 1110 to also sink towards the bottom of the column 1100. The weighting agent 1130 may be any weighting agent known to be used in drilling mud, such as barite or hematite.

Figure 11B:
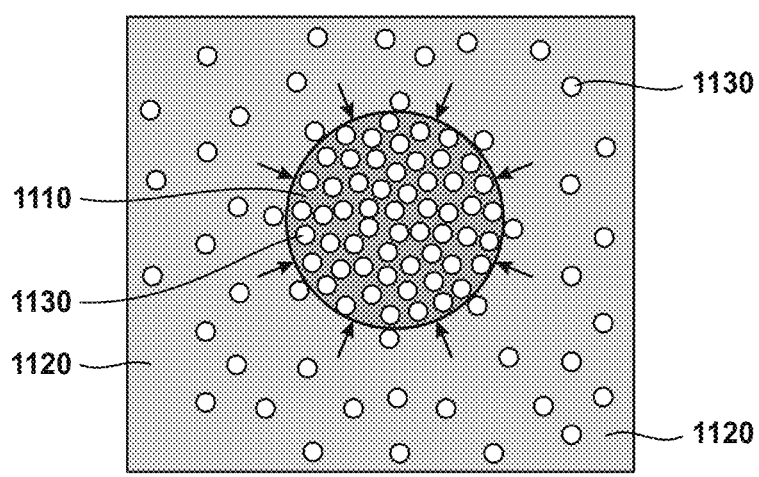
FIG. 11B is an enlarged view of one of the particles from FIG. 11A. It can be seen that the collapsible particle is designed to be considerably larger in size compared to weighting agent particles in the carrier fluid.

To avoid this scenario, the density of the particles 1110 can be engineered and adjusted. FIG. 11B is an enlarged view of one of the particles 1110 from FIG. 8A. It can be seen that the collapsible particle 1110 is designed to be about 100 times larger in size compared to the weighting agent particles 1130. The large difference in the particle size between the compressible particles 1110 and the weighting agent particles 1130 reduces the amount of drag/sag during solids settlement, and reduces the concentration of the compressible particles 1110 in the annular fluid 1120.

In some instances, the presence of the weighting agent particles 1130 is beneficial, particularly for compressible particles 1110 that have lower compressibility. In this case it is desirable for the particles 1110 to settle lower along the column 543. A weighting agent will help keep the particles within the desired range of depth for maximum compressibility as discussed above in connection with FIG. 10B, that is, between Depths 1 and 2.

For particles with a higher compressibility, a lower density can be achieved by designing the larger particles 1110 to have increased pore volume. In this way, the particles 1110 stay buoyant in the fluid 1120 even in the presence of weighting agent 1130 particles. The density of the collapsible particles 1110 should be lower than that of the weighting agent particles 1130. The collapsible particles 1110 may also be designed to have limited affinity to the weighting agent particles 1130.

This issue of drag caused by the weighting agent particles 1130 can be further mitigated by applying a coating (shown at 700C in FIG. 7C) to the particles 1110. The coating 700C will serve as a wetting agent or enhanced particle disperser. Collapsible particle clogging/conglomeration is thereby reduced in low flow through and suspension volume areas. The use of a coating 700C may also increase uniformity in compressible particle distribution in suspension operations. Increased distribution of collapsible particles 1110 through the annulus 542 would not significantly increase kinetic energy, temperature build, or pressure build.

It is again observed that if the particles 1110 cannot be suspended in the annular fluid, the particles will either settle down in the column 1100 or settle (or float) up in the column 1100, depending on the relative specific gravities of the fluid 1120 versus the compressible particles 1110. Settling down results in a state where the weight of the particles 1110 is pulling the bed into a more compacted state. Settling up results in a situation where the weight of the particles 1110 is pushing the bed into a less compacted state. This results in a higher likelihood of pressure penetration from one side of the particle bed to the other side of the particle bed.

The operator may therefore prefer a configuration where a bed of particles 546 is used that intentionally floats to the top of the annulus 542. For this, the particle density can be engineered to ensure it is buoyant in the carrier fluid 543. For example, this can be achieved by modifications to particle shape, size, porosity, morphology, texture, and material.

Figure 5C:
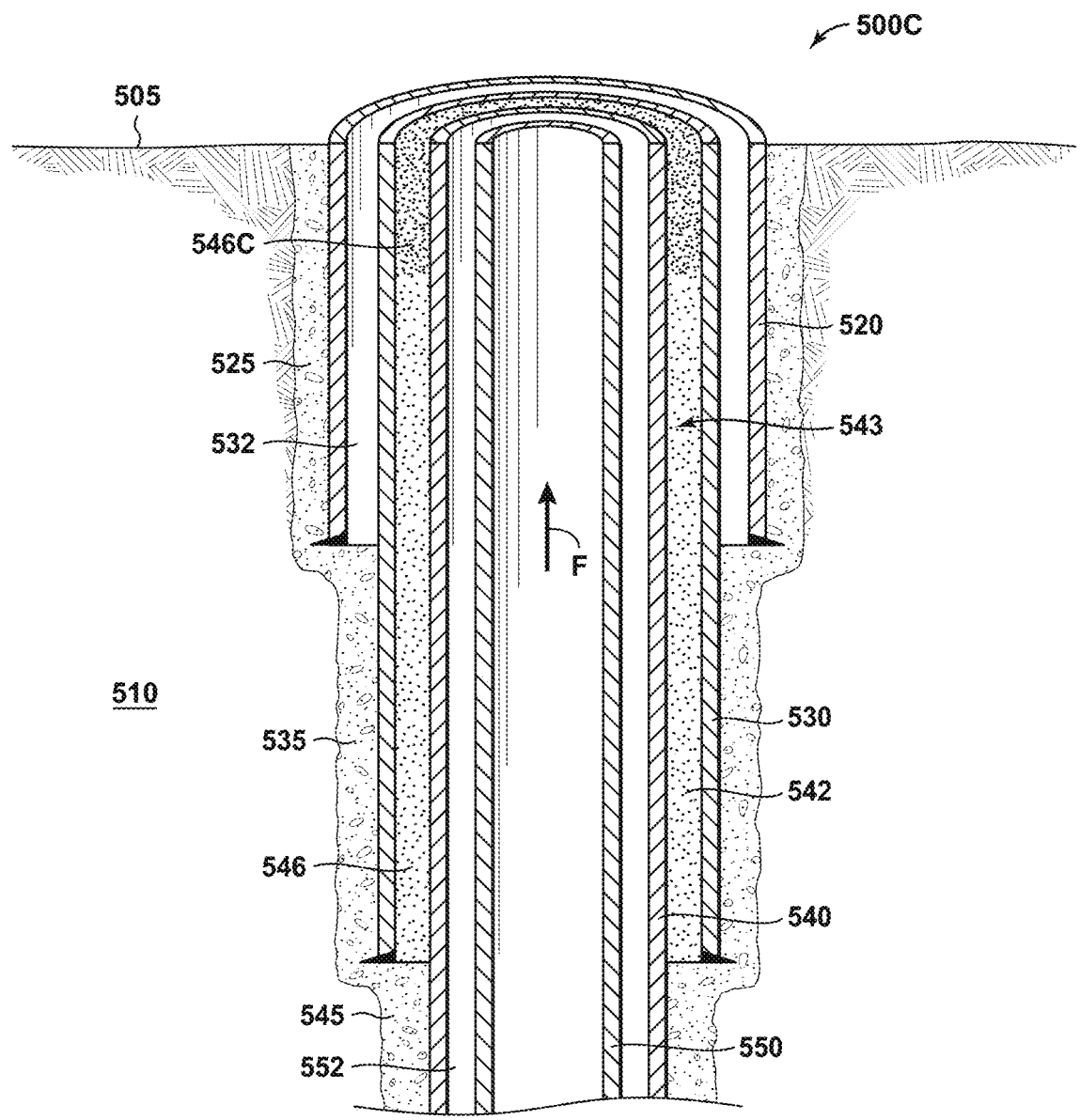
FIG. 5C is still another perspective view of the upper portion of a wellbore. In this instance, a column of carrier fluid holding compressible particles is again placed in the unfilled annular space around an intermediate string of casing. The compressible particles are suspended more densely along an upper end of the trapped annulus.

FIG. 5C is another perspective view of the upper portion of a wellbore 500C. In this instance, a column of carrier fluid 543 holding compressible particles 546 is again placed in the unfilled annular space 542 (or trapped annulus) around an intermediate string of casing 540. The compressible particles 546 are dispersed along the fluid column 543. However, in this view the concentration of particles 546 is greater along an upper portion 546C of the column of carrier fluid 543. This may be because the fluid mixture pumped into the annular region 542 had a higher concentration of compressible particles 546 at the beginning of the pump stage than at the end. Alternatively or in addition, this may be because the particles 546 at the top of the column 543 are tuned to have a higher degree of buoyancy.

Placing a majority of the compressible particles 546 at or near the upper end of a trapped annulus 542 allows the column of fluid 543 within the trapped annulus 542 to expand upward against the compressible particles 546. This results in a higher probability that the pressure will migrate through the bed, maximizing the amount of particles that are compressed.

Regardless of location within the column 543, the density of the individual particles 546 should be lower than the density of the carrier fluid 543 to enable buoyancy. Particle density may be tuned by increasing or decreasing porosity, increasing or decreasing particle shape or size, or by selecting a lighter or heavier carbon material. In general, buoyancy may be increased by increasing porosity (such as is shown in FIG. 7A) and by selecting a lighter carbon material. Compressibility may be enhanced by increasing porosity and by providing an elastomeric coating along either pore channel walls or the outer diameter (such as is shown in FIG. 7C). Pressure penetration may be enhanced by providing a randomness to the particle profiles (such as is shown in FIGS. 7B and 8B) which prevents packing.

It is observed from FIG. 5C that as the compressible particles 546 rise along the column 543, any weighting agent particles (shown at 1130 in FIGS. 11A and 11B) will settle out below the compressible particles 546. In some instances, weighting agent particles 1130 will settle to the bottom as demonstrated in FIG. 11A. A fraction of the lighter, collapsible particles 546 (or 1110 as shown in FIG. 11A) may also be pulled down with the barite particles 1130 to form a compacted bed with the barite particles 1130. This phenomenon may be referred to as barite "sag."

Barite sag will have the undesirable effect of dragging at least a small portion of the compressible particles 546 to the bottom of the annular region 542. This both reduces the dispersion of particles 546 along the fluid column 543 and creates an undesirable packing of particles at the bottom of the column 543. To minimize this, and as noted above, at least some of the collapsible particle 1110 may be designed to be about 100 times larger in size compared to the weighting agent particles 1130. The large difference in the particle size between the compressible particles 1110 and the weighting agent particles 1130 reduces the amount of drag/sag during solids settlement. The difference in size, shape, particle morphology and density between the barite and collapsible/compressible particles is such that fluid pressure can still reach up through the column 543 and to the compressible particle 546 at the top even after solid settlement in the lower regime in the column 543.

With respect to each of FIGS. 5B and 5C, it is noted that each of areas 532 and 552 is also a trapped annulus. However, these annuli 532, 552 are not shown as having compressible particles 546. The operator may add compressible particles in these annuli 532, 552 using the method 600 described in FIG. 6. On this note, FIG. 6 finally includes the step of pumping the mixture (that is, the carrier fluid with suspended compressible particles) into a wellbore annulus. This is seen in Box 680. The carrier fluid is pumped in ahead of the cement column.

As can be seen, a unique collection of compressible particles is provided. The compressible particles are intended to be used for attenuating pressure within a confined volume such as a trapped annulus within a wellbore.

Preferably, the compressible particles reside within an aqueous fluid, forming a fluid mixture. The aqueous carrier fluid may be fresh water, brine or an aqueous drilling fluid. In one aspect, the compressible particles are at a concentration of 5% to 40% of the fluid mixture, by volume, providing in additional volume into which fluid can expand under pressure.

Each of the particles preferably comprises carbon. At least some of the compressible particles may comprise graphite or graphene beads. In one embodiment, each of the compressible particles has an outer diameter that is between 10 µm and 700 µm (in dry state). More preferably, the particle size distribution will be between 100 µm to 700 µm, and may average around 250 µm. Together, the particles may have an average porosity of between 10% and 25%.

Each of the particles has a resiliency of between 80% and 120%, and more preferably between 87% and 117%, inclusive. At the same time, each of the particles may have a compressibility of between 10% and 30%, and more preferably between 14% and 27%, inclusive, up to 10,000 psi. Preferably, the fluid mixture further comprises a reductant provided to reduce gas content.

Each of the compressible particles may comprise an elastomeric coating. The elastomeric coating may comprise neoprene, polyurethane rubber, vinyl, nitrile rubber, butyl rubber, EPDM rubber, silicone rubber, or combinations thereof. In one aspect, the elastomeric coating of each of the compressible particles has a negative charge, causing the compressible particles to repel each other.

In one embodiment, the compressible particles comprise: first compressible particles having a first degree of compressibility; and second compressible particles having a second degree of compressibility; and wherein the first degree of compressibility is higher than the second degree of compressibility.

In another embodiment, the compressible particles comprise: first compressible particles having a first density; and second compressible particles having a second density; and wherein the first density is greater than the second density.

A method of placing particles within a wellbore is provided. The particles are designed to volumetrically compress as pressure increases in a confined volume such as a trapped annulus, thereby mitigating detrimental effects due to latent pressure increases upon the wellbore tubulars forming the annulus. For example, as a well begins producing hot fluids from deep production zones, the hot fluids may increase the pressure within the tubing, which in turn can heat the casing surrounding the tubing. These temperature increases may result in increases in annular pressure. While land-based wellheads can provide means for bleeding off the pressure increases, subsea wellheads typically do not provide means for bleeding pressure increases. The consequence of this can be collapse or burst of wellbore tubulars. The mitigating compressibility and resilience of the particles serves to prevent the pressure from increasing as much as it otherwise would without the compressible particles being placed in the annulus. The compressibility results in additional compressible volume into which the annular fluid can expand, at pressures below the damage point of the tubulars.

A useful method for mitigating pressure increases within a wellbore is provided that includes placing compressible particles within an annular area of a wellbore that includes a first string of casing positioned within an upper portion (meaning, closer to the well surface) of the wellbore and a second string of casing extending within at least a portion of the first string of casing and into an extended portion (meaning further downhole with respect to the surface region of the wellbore) of the wellbore below (meaning further downhole with respect to the surface region) the first string of casing. The first string of casing surrounds an overlapped portion of the second string of casing, thereby creating a fluid-filled annulus between first string of casing and the overlapped portion of the second string of casing. The annular volume may also include the volume between the second string of casing and the formation adjacent the extended portion of the wellbore.

The concentration of the compressible particles are dispersed in a fluid mixture that comprises a carrier fluid (either an aqueous or hydrocarbon based liquid that does not promote premature degradation of the particulates) and a concentration of compressible particles dispersed in the carrier fluid. The "concentration" generally refers to a determined weight or volume of the particulates within the carrier fluid, but does not require a specifically determined concentration value. A plurality or dispersion of particles is also suitable. The carrier fluid may include other components such as corrosion inhibitors, gel, viscosifying agents, etc. The concentration of the compressible particles may be determined by volume or weight, and will vary depending upon the compressibility of the particles, the pressures anticipated within the wellbore, expected tubular volume change, permissible tubular pressure range, and projected annular volume expansion. Exemplary concentrations of mineral-based particulates, such as graphitic or carbon based compositions, without limitation, may be for example, from 1 pound per barrel (ppb) of carrier fluid to 125 ppb, or 1 ppb to 100 ppb, or 1 ppb to 50 ppb, or 1 ppb to 25 ppb, or 1 ppb to 10 ppb. Suitable concentrations of polymeric compositions may be proportionately lower with respect to their lower bulk density or specific gravity as compared to the mineral-based particulates. Lab testing under projected annular conditions is recommended to ascertain the desired particulate concentration and performance factors. Some wellbore annular tubular combinations and/or production temperature conditions may require substantial protection from pressure increases and corresponding substantial deformation and/or resiliency, while others may only require a nominal amount of protection.

The concentration may be considered a plurality of particles, as the desired particles should remain individually granular particulates when subjected to pressures of up to 10,000 psig, without packing or losing granularity. It is preferred that the particles remain as distinct particles over when indefinitely subjected to pressure of up to 10,000 psig at maximum expected wellbore temperature. Resiliency is the ability of the particulate particles to absorb energy by volumetrically compressing, and then upon release of the energy to recover a percentage of the lost volume. The claimed particles must not only compress under increasing pressure, but they also must be able to recover at least 50% of the compressed volume upon release of that pressure. The volume recovery is the resiliency. It is the volume recovery that is important in the annulus fluid mixture, because over its life, a trapped annulus will experience numerous pressure (and thermal) changes due to changes in production activity, shut-in periods, stimulation, well treatments, etc. Particulates that merely compress without sufficient recovery (resilience or elastic expansion) are not useful for pressure compensation purpose over the life of the well. An ideal recovery would be 100% by volume.

What is suitable for the present technology is a compressible particulate concentration that, after initial placement in the wellbore, can volumetrically compress or deform (e.g., compress, elongate, flatten, pack together, shrink in bulk diameter, and/or otherwise change in bulk volume for the plurality of particulates) by at least 10% by volume, or at least 20%, or at least 50% in response to further increased applied pressure after placement in the annulus, that is, as compared to their volume in the annulus immediately after placement therein, even if them somewhat compressed. Stated differently, although the compressible particles may compress somewhat in response to their initial pumping and placement in the wellbore, such as in conjunction with a cementing job, wherein they experience an initial hydrostatic pressure profile within the annulus, it is the further or subsequent compression that is relevant for the particles performing their intended function in the annulus. That further or subsequent compression may be due to any of a number of operational factors such as thermal heating due to production operations. Thereafter, the particles should be able to recover at least 50% of that further, or subsequent compression (deformation).

The important compressibility and resilience feature that is key is the ability to further compress after initial placement in the wellbore. Initial placement in the wellbore refer to the time when the particles are first pumped into the wellbore annulus and pumping is ceased such that the fluid mixture with the particles is generally at its intended location, such as at the end of pumping cement and displacing the wiper plug, before cement sets up. The further important function of the particles is their ability to then resiliently recover from that additional deformation or compression that happened subsequent to initial annular placement. The particles should be able to further compress by at least 10% by volume, or at least 20%, or at least 50% in response to the subsequently applied pressure (subsequent to initial placement in the annulus). This subsequent or further pressure increase may be caused by wellbore activities or events as described previously herein, such as production of hot produced fluids through the wellbore.

Thereafter, when the applied fluid pressure is removed or reduced, the particles resiliently recover and reform or expand back volumetrically by at least 50%, or at least 60%, or at least 70%, or at least 100%, or even at least 110%, with respect to the volume of the particulates in the annulus immediately after placement, prior to the subsequent application of the pressure in the annulus. Preferred particles will be able to effectively repeat this cycle many times. The ability of the particles to reform by at least 50% is desirable, more than 60% more desirable, and by at least 80% even more desirable. Recovery of 100% is ideal, but many particulate materials will likely experience at least some mild degree of hysteresis, such as some fluid permeation into a few of the pores of some portions of some of the particulates. The feature of recovery or expanding back after removal of the pressure increase is preferably an elastic strain recovery. The concept of recovery is referred to herein as resilience.

Thereby, the compressible particulates are useful for compensating for subsequent, repeated pressure increases according to their intended purpose, over a desired life-range in the wellbore annulus. From a stress-strain perspective, it is desirable that the volume changes due to pressure increases of up to 10,000 psig can be repeatedly applied, even if not to the same degree as for previous volume changes. The preferred particles exhibit at least 10% of resiliency, by volume. As for particulate dispersion or distribution within the annulus, it is not required that the particulates remain evenly or otherwise distributed over the length of the wellbore annulus. The particulates may, over time, accumulate in a lower region of the annular area, due to gravitational deposition. So long as the desired, overall compressibility and recovery or resilience of the plurality of particulates provides the desired amount of resiliency or recovery, then accumulation in the lower portion of the wellbore should not be detrimental. However, if the accumulation in the lower portion of the wellbore becomes excessive to the point that the particulates within the lower portion of the packed volume do not experience the pressure increase, then care should be considered to determine whether the carrier fluid should have some gel or particulate-suspending properties that will keep the particulates suspended in a fashion that will permit sufficient volume of the particulates to pressure exposure and contribute to the desired pressure compensation in the annulus.

Further variations of the collection of buoyant particles as may be used to mitigate pressure within a trapped annulus herein may fall within the spirit of the claims, below. It will be appreciated that the inventions are susceptible to modification, variation and change without departing from the spirit thereof.

INDUSTRIAL APPLICABILITY

The systems and methods disclosed herein are applicable to the oil and gas industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements, and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

What is claimed is:

1. A collection of compressible particles, wherein each of the compressible particles is fabricated to collapse in response to fluid pressure within a confined volume, and wherein:
    the collection of compressible particles are buoyant when placed within an aqueous carrier fluid, wherein the buoyancy of the compressible particles is achieved by providing each compressible particle with a porosity in a range between 5% and 40%, an irregular particle shape, an outer diameter in a range between 10 μm and 700 μm (in dry state), and a specific gravity in a range of plus/minus 0.5, inclusive, of the specific gravity of the carrier fluid, and wherein the buoyancy is provided such that the compressible particles are capable of being suspended more densely at a desired location within the confined volume;
    each of the compressible particles comprises carbon;
    each of the particles has a resiliency that is between 80% and 120%, inclusive;
    each of the compressible particles has a compressibility of between 10% and 30%, up to 10,000 psi; and
    wherein the compressible particles are provided with a variety of irregular particle shapes, a variety of outer diameters that are in the range between 10 μm and 700 μm (in dry state), and a variety of specific gravities that are in the range of plus/minus 0.5, inclusive, of the specific gravity of the carrier fluid.

2. The collection of compressible particles of claim 1, wherein at least 50% of the compressible particles have a range of outer diameter that is between 50 μm to 600 μm.

3. The collection of compressible particles of claim 1, wherein the compressible particles have an average porosity of between 10% and 25%.

4. The collection of compressible particles of claim 1, wherein:
    each of the compressible particles has a compressibility of between 14% and 27%, up to 10,000 psi; and
    each of the particles has a resiliency of between 87% and 117%, inclusive.

5. The compressible particles of claim 1, wherein each of the compressible particles has a same polygonal profile.

6. The compressible particles of claim 1, wherein the variety of irregular particle shapes of the compressible particles comprises random polygonal profiles.

7. The compressible particles of claim 1, wherein an average size of each of the compressible particles is between 200 μm and 400 μm (in dry state).

8. The compressible particles of claim 1, wherein:
    each of the compressible particles comprises a porous graphite carbon (PGC) material wherein an inner core is composed of amorphous carbon, while an outer shell is composed of graphitic carbon; and
    both the inner core and the outer shell are porous.

9. The compressible particles of claim 1, wherein the compressible particles comprise graphene beads.

10. The compressible particles of claim 1, wherein each of the compressible particles comprises pore channels coated with natural rubber or a polymer serving as a synthetic rubber.

11. The compressible particles of claim 1, wherein each of the compressible particles comprises an elastomeric coating.

12. The compressible particles of claim 11, wherein the elastomeric coating comprises neoprene, polyurethane rubber, vinyl, nitrile rubber, butyl rubber, EPDM rubber, silicone rubber, or combinations thereof.

13. The compressible particles of claim 11, wherein the elastomeric coating of each of the compressible particles has a negative charge, causing the compressible particles to repel each other.

14. The compressible particles of claim 1, wherein the compressible particles comprise:
    first compressible particles having a first degree of compressibility; and
    second compressible particles having a second degree of compressibility;
    and wherein the first degree of compressibility is higher than the second degree of compressibility.

15. The compressible particles of claim 1, wherein the compressible particles comprise:
    first compressible particles having a first density; and
    second compressible particles having a second density;
    and wherein the first density is greater than the second density.

16. The compressible particles of claim 1, wherein:
the compressible particles reside within an aqueous fluid, forming a fluid mixture; and
the compressible particles are at a concentration of 5% to 40% of the fluid mixture, by volume.

17. The compressible particles of claim 16, wherein:
the aqueous fluid is a drilling fluid having residual weighting agent particles therein; and
at least some of the compressible particles have a diameter that is at least 100 times a diameter of the weighting agent particles.

* * * * *